US009058266B2

(12) United States Patent
Choi

(10) Patent No.: US 9,058,266 B2
(45) Date of Patent: Jun. 16, 2015

(54) DESKEW APPARATUS AND METHOD FOR PERIPHERAL COMPONENT INTERCONNECT EXPRESS

(71) Applicant: ELECTRONICS AND TELECOMMUNICATIONS RESEARCH INSTITUTE, Daejeon (KR)

(72) Inventor: Yong-Seok Choi, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 175 days.

(21) Appl. No.: 13/835,084

(22) Filed: Mar. 15, 2013

(65) Prior Publication Data

US 2013/0268814 A1  Oct. 10, 2013

(30) Foreign Application Priority Data

Apr. 5, 2012  (KR) .................. 10-2012-0035725

(51) Int. Cl.
*G06F 11/07* (2006.01)
*G06F 13/42* (2006.01)
*G06F 13/38* (2006.01)
(Continued)

(52) U.S. Cl.
CPC .......... *G06F 11/0793* (2013.01); *G06F 13/102* (2013.01); *G06F 13/385* (2013.01); *G06F 5/06* (2013.01); *G06F 13/4013* (2013.01); *G06F 13/4217* (2013.01); *G06F 13/42* (2013.01); *G06F 13/4027* (2013.01); *H04J 3/062* (2013.01); *H04L 7/005* (2013.01); *H04L 7/10* (2013.01); *G06F 13/4278* (2013.01);
(Continued)

(58) Field of Classification Search
CPC . G06F 13/423; G06F 11/0793; G06F 13/385; G06F 5/06; G06F 13/102; G06F 13/4013; G06F 13/4027; G06F 13/42; G06F 13/4217; G06F 13/4278; G06F 2213/0026; H04L 7/005; H04L 7/10; H04J 3/062; H04J 3/0629; H04J 3/073; G11C 7/1084; G11C 7/109
USPC ......... 714/701, 700, 707, 709, 712, 713, 715, 714/716, 717, 724, 734, 735, 736, 742, 744, 714/820, 799, 43, 56, 25; 710/52; 341/52, 341/100
See application file for complete search history.

(56) References Cited

U.S. PATENT DOCUMENTS 7,007,115 B2 * 2/2006 Elboim et al. ............... 710/52
7,174,412 B2 * 2/2007 Lin ............................. 710/316
(Continued)

FOREIGN PATENT DOCUMENTS

KR  10-2006-0059615  6/2006
KR  10-2006-0081522  7/2006

*Primary Examiner* — John J Tabone, Jr.
(74) *Attorney, Agent, or Firm* — Staas & Halsey LLP

(57) ABSTRACT

Disclosed herein are a deskew apparatus and method for Peripheral Component Interconnect (PCI) Express for compensating for a skew. The deskew apparatus includes a lane data input unit, a lane data alignment unit, and a lane data detection unit. The lane data input unit receives 18-bit data from each of lanes of the PCI Express. The lane data alignment unit aligns the 18-bit data using a COM symbol. The lane data detection unit detects a change in a state of alignment of the 18-bit data attributable to deletion or addition of an SKP symbol when the 18-bit data is aligned, and to perform synchronization between the lanes.

16 Claims, 22 Drawing Sheets

(51) Int. Cl.
*G06F 13/10* (2006.01)
*G06F 5/06* (2006.01)
*G06F 13/40* (2006.01)
*H04J 3/06* (2006.01)
*H04L 7/00* (2006.01)
*H04L 7/10* (2006.01)
*H04J 3/07* (2006.01)

(52) U.S. Cl.
CPC .............. *H04J3/073* (2013.01); *H04J 3/0629* (2013.01); *G06F 13/423* (2013.01)

(56) References Cited

U.S. PATENT DOCUMENTS

| | | | |
|---|---|---|---|
| 7,225,354 B2* | 5/2007 | Tseng | 713/503 |
| 7,230,549 B1* | 6/2007 | Woodral et al. | 341/52 |
| 7,434,114 B2* | 10/2008 | Jang et al. | 714/700 |
| 7,913,001 B2* | 3/2011 | Renaud et al. | 710/54 |
| 7,979,608 B2* | 7/2011 | Renaud et al. | 710/54 |
| 8,161,210 B1* | 4/2012 | Norrie | 710/65 |
| 8,166,334 B2* | 4/2012 | Lai et al. | 713/500 |
| 8,285,884 B1* | 10/2012 | Norrie | 710/14 |
| 8,806,093 B2* | 8/2014 | Chacko et al. | 710/62 |
| 8,867,683 B2* | 10/2014 | Thanigasalam | 375/372 |
| 2005/0015522 A1* | 1/2005 | Elboim et al. | 710/52 |
| 2005/0024926 A1* | 2/2005 | Mitchell et al. | 365/154 |
| 2005/0141661 A1* | 6/2005 | Renaud et al. | 375/372 |
| 2005/0144342 A1* | 6/2005 | Renaud et al. | 710/52 |
| 2006/0156083 A1* | 7/2006 | Jang et al. | 714/700 |
| 2007/0177701 A1* | 8/2007 | Thanigasalam | 375/372 |
| 2008/0147916 A1* | 6/2008 | Mao | 710/52 |
| 2010/0315135 A1* | 12/2010 | Lai et al. | 327/145 |
| 2011/0243211 A1* | 10/2011 | Chacko et al. | 375/228 |
| 2014/0101356 A1* | 4/2014 | Sonoda et al. | 710/313 |

\* cited by examiner

DESKEW APPARATUS AND METHOD FOR PERIPHERAL COMPONENT INTERCONNECT EXPRESS

CROSS REFERENCE TO RELATED APPLICATION

This application claims the benefit of Korean Patent Application No. 10-2012-0035725, filed on Apr. 5, 2012, which is hereby incorporated by reference in its entirety into this application.

BACKGROUND OF THE INVENTION

1. Technical Field

The present invention relates generally to a deskew apparatus and method for Peripheral Component Interconnect (PCI) Express and, more particularly, to a deskew apparatus and method for PCI Express which align input data in PCI Express on an 18-bit basis, thereby compensating for static skew as well as dynamic skew.

2. Description of the Related Art

The speed of PCI Express was typically 2.5 Gbps in its early stage, and is now 5 Gbps in line with the trend of favoring high speed. An 8-Gbp device is expected to be released in the near future. The unit of data that is basically used in PCI Express is 1 byte, that is, 8 bits. In the early 2.5 Gbp scheme, the data width and operating speed of an interface in a serial/parallel device were 8 bits and 250 MHz or 16 bits and 125 MHz. In the recent 5 Gbp scheme, however, the data width and operating speed of the interface are typically 16 bits and 250 MHz because of the limitations of a protocol engine. In the case of 8 Gbps, there is the strong possibility of the data width and operating speed of the interface being 16 bits and 500 MHz or 32 bits and 250 MHz.

Accordingly, when received data is 16-bit data or 32-bit data, bytes forming the data are not aligned, and thus there is a need for a logic for additionally aligning the packets of a physical layer, a data link layer and a transaction layer when detecting the packets.

In this PCI Express standard, when a multi-channel skew occurs, it is recommended that a multi-channel skew be performed using a COM symbol inside a TS sequence set or an SKP sequence set, that is, physical layer packets. The use of other deskew devices is optional.

FIG. 1 is a diagram schematically showing the structure of a conventional deskew apparatus based on 9-bit data input. Referring to FIG. 1, the conventional deskew apparatus aligns data based on 1 byte, that is, 8 bits (i.e., the basic unit of the PCI Express standard), +1 bit=9 bits and only a COM symbol. In this deskew apparatus, a reference lane processor 20 receives 9-bit data from the 9-bit data input unit 10 of a reference lane, and the received 9-bit data is stored in the 9-bit register 21 of the reference lane processor 20 in accordance with a clock. Data is transmitted to lower 9-bit registers 22 to 26 per clock cycle. A COM comparator 27 is attached to the 9-bit register 26, that is, a final stage, and generates a value of 1 whenever a COM symbol is generated. The value of the 9-bit register 26, that is, the final stage, becomes the output value of the reference lane processor 20 and is output to a 9-bit data output unit 70. An additional lane processor 40 receives 9-bit data from a 9-bit data input unit 30, that is, an additional lane, and the received 9-bit data is stored in the 9-bit register 41 of the additional lane processor 40 in accordance with a clock. Data is propagated to lower 9-bit registers 41 to 51 per clock cycle. COM comparators 52 to 62 are attached to the respective 9-bit registers 41 to 51, and each generates a value of 1 whenever a COM symbol is generated. Here, an 11×9 bit data selector 63 determines which of the COM comparators 52 to 62 has a value of 1 when the output value of each of the COM comparators 52 to 62 becomes 1. Then the 11×9 bit data selector 63 determines the value that is selected from among the values of the 9-bit registers 41 to 51 based on the results of the determination. The value selected by the 11×9 bit data selector 63 is output to a 9-bit data output unit 80.

The conventional deskew apparatus configured to have the above-described configuration and align data based only on a COM symbol is disclosed in Korean Unexamined Patent Publication No. 2006-0081522 (published on Jul. 13, 2006) entitled "Method of Compensating for Byte Skew of PCI Express and PCI Express Physical Layer Receiver for the Same." The conventional deskew apparatus is not problematic when data including transmission information comes immediately after a COM symbol because data is aligned such that data after the COM symbol has the same timing. However, it is problematic in that a byte skew is not compensated for when an SKP symbol is transmitted after a COM symbol and the SKP symbol is added or deleted.

Accordingly, there is an urgent need for a method and apparatus for appropriately compensating for a skew regardless of the addition or deletion of an SKP symbol in PCI Express.

SUMMARY OF THE INVENTION

Accordingly, the present invention has been made keeping in mind the above problems occurring in the prior art, and an object of the present invention is to provide a deskew apparatus and method for PCI Express, which is a technology for removing the skew between lanes without loss of data in the physical layer of PCI Express including multiple lanes, and which can align input data, composed of two upper and lower bytes, that is, 16 bits, rather than 1 byte, that is, 8 bits (i.e., the basic unit of data in the PCI Express standard), based on the lower byte, thereby preventing data from being lost.

Another object of the present invention is to provide a deskew apparatus and method for PCI Express, which can detect a change in a state of alignment attributable to the deletion or addition of an SKP symbol when data is aligned, thus being able to deal with data being in a state of non-alignment as occurs because of the use of an SKP sequence set that compensates for the difference in the clock speed between lanes.

In order to accomplish the above objects, the present invention provides a deskew apparatus for PCI Express for compensating for a skew, the deskew apparatus including a lane data input unit configured to receive 18-bit data from each of lanes of the PCI Express; a lane data alignment unit configured to align the 18-bit data using a COM symbol; and a lane data detection unit configured to detect a change in a state of alignment of the 18-bit data attributable to deletion or addition of an SKP symbol when the 18-bit data is aligned, and to perform synchronization between the lanes.

The lane data alignment unit may include a 9-bit lower data input unit configured to receive 9-bit data, including the COM symbol, which is selected from the 18-bit data; a 9-bit upper data input unit configured to receive 9-bit data, including a symbol other than the COM symbol, which is selected from the 18-bit data; a 9-bit lower data register configured to store content of the 9-bit lower data input unit; a 9-bit upper data register configured to store content of the 9-bit upper data input unit; an alignment signal output unit configured to output an alignment signal by determining whether the pieces of received 9-bit data have been aligned; and a data control unit configured to control output of the pieces of 9-bit data based on results of the determination.

The alignment signal output unit may output the alignment signal as '0' if, as a result of the determination, it is determined that the pieces of received 9-bit data are in a state of alignment, and may output the alignment signal as '1' if, as a result of the determination, it is determined that the pieces of received 9-bit data are in a state of non-alignment.

The alignment signal output unit may determine that the pieces of received 9-bit data are in a state of alignment if the 9-bit data input to the 9-bit lower data input unit is the COM symbol and the 9-bit data input to the 9-bit upper data input unit is a symbol other than the COM symbol.

The alignment signal output unit may determine that the received 9-bit data is in a state of non-alignment if the 9-bit data input to the 9-bit lower data input unit is a symbol other than the COM symbol and the 9-bit data input to the 9-bit upper data input unit is the COM symbol.

The data control unit, if, as a result of the determination, it is determined that the received 9-bit data is in a state of alignment, may perform control so that the content of the 9-bit lower data register is output to a 9-bit lower data output unit and the content of the 9-bit upper data register is output to a 9-bit upper data output unit.

The data control unit, if, as a result of the determination, it is determined that the received 9-bit data is in a state of non-alignment, may perform control so that the content of the 9-bit lower data register is output to a 9-bit upper data output unit and the content of the 9-bit upper data register is output to a 9-bit lower data output unit.

The lane data detection unit may include an SKP comparator configured to output a value of the SKP symbol attributable to the addition or deletion of the SKP symbol when the 18-bit data is aligned; and a COM comparator configured to output a value of the COM symbol corresponding to the output value of the SKP symbol.

The lane data detection unit may compare the output value of the SKP symbol with the value of the COM symbol, and, if, as a result of the comparison, a requirement of an SKP sequence set is not satisfied, perform the synchronization by changing the value of the SKP symbol to the value of the COM symbol.

The lane data detection unit may compare the output value of the SKP symbol with the value of the COM symbol, and, if, as a result of the comparison, there is redundancy in an SKP sequence set, perform the synchronization by changing the value of the SKP symbol to the value of the SKP other than the value of the COM symbol.

In order to accomplish the above objects, the present invention provides a method of compensating for deskew of Peripheral Component Interconnect (PCI) Express, the method including receiving, by a lane data input unit, 18-bit data from each of lanes of the PCI Express; aligning, by a lane data alignment unit, the 18-bit data using a COM symbol; and detecting, by a lane data detection unit, a change in a state of alignment of the 18-bit data attributable to deletion or addition of an SKP symbol when the 18-bit data is aligned, and performing, by a lane data detection unit, synchronization between the lanes.

The aligning the 18-bit data using the COM symbol may include determining, by the lane data alignment unit, that received 9-bit data is in a state of alignment if 9-bit data input to a 9-bit lower data input unit is the COM symbol and 9-bit data input to a 9-bit upper data input unit is a symbol other than the COM symbol.

The aligning the 18-bit data using the COM symbol may include determining, by the lane data alignment unit, that received 9-bit data is in a state of non-alignment if 9-bit data input to a 9-bit lower data input unit is a symbol other than the COM symbol and 9-bit data input to a 9-bit upper data input unit is the COM symbol.

The method may further include, after the detecting a change in a state of alignment of the 18-bit data attributable to the deletion or addition of an SKP symbol when the 18-bit data is aligned and performing synchronization between the lanes, comparing, by the lane data detection unit, a value of the SKP symbol, output because of the addition or deletion of the SKP symbol when the data is aligned, with a value of a COM symbol output in accordance with the value of the SKP symbol, and then changing a symbol based on results of the comparison.

The changing the symbol may include comparing, by the lane data detection unit, the output value of the SKP symbol with the value of the COM symbol, and, if, as a result of the comparison, a requirement of an SKP sequence set is not satisfied, performing, by the lane data detection unit, the synchronization by changing the value of the SKP symbol to the value of the COM symbol.

The changing the symbol may include comparing, by the lane data detection unit, the output value of the SKP symbol with the value of the COM symbol and, if, as a result of the comparison, there is redundancy in an SKP sequence set, performing, by the lane data detection unit, the synchronization by changing the value of the SKP symbol to the value of the SKP other than the value of the COM symbol.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The embodiments of the present invention will be described with reference to the accompanying drawings in order to fully describe the present invention so that persons having ordinary skill in the art can easily practice the technical spirit of the present invention. It should be noted that similar reference symbols are used to designate similar elements throughout the drawings even when the elements are depicted in different drawings. Furthermore, in the following description of the present invention, detailed descriptions of one or more related well-known constructions and/or one or more functions which have been deemed to make the gist of the present invention unnecessarily vague will be omitted.

A deskew apparatus and method for PCI Express according to embodiments of the present invention will be described in detail with reference to the accompanying drawings.

Figure 1:
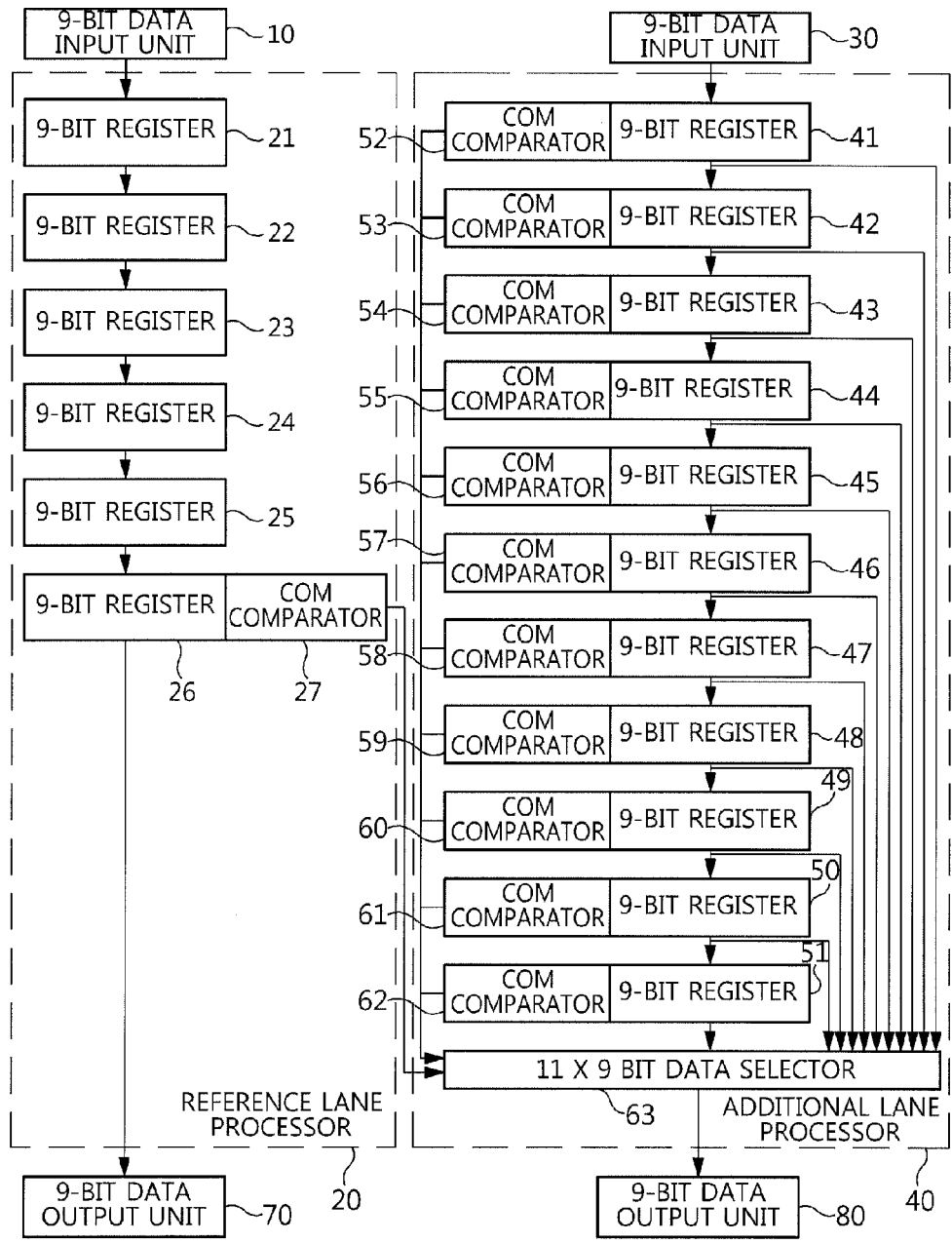
FIG. 1 shows the configuration of a conventional deskew apparatus based on 9-bit data input.
Figure 2:
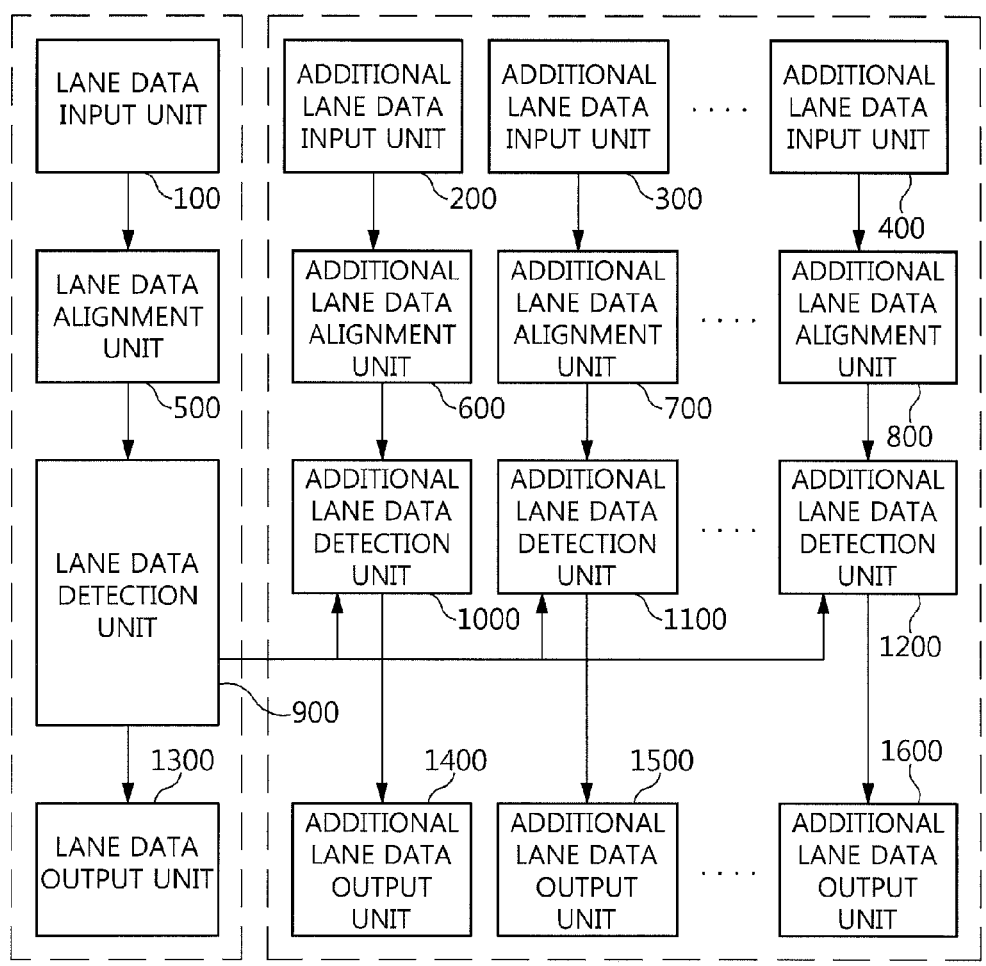
FIG. 2 shows the configuration of a deskew apparatus for PCI Express according to an embodiment of the present invention.
Figure 3:
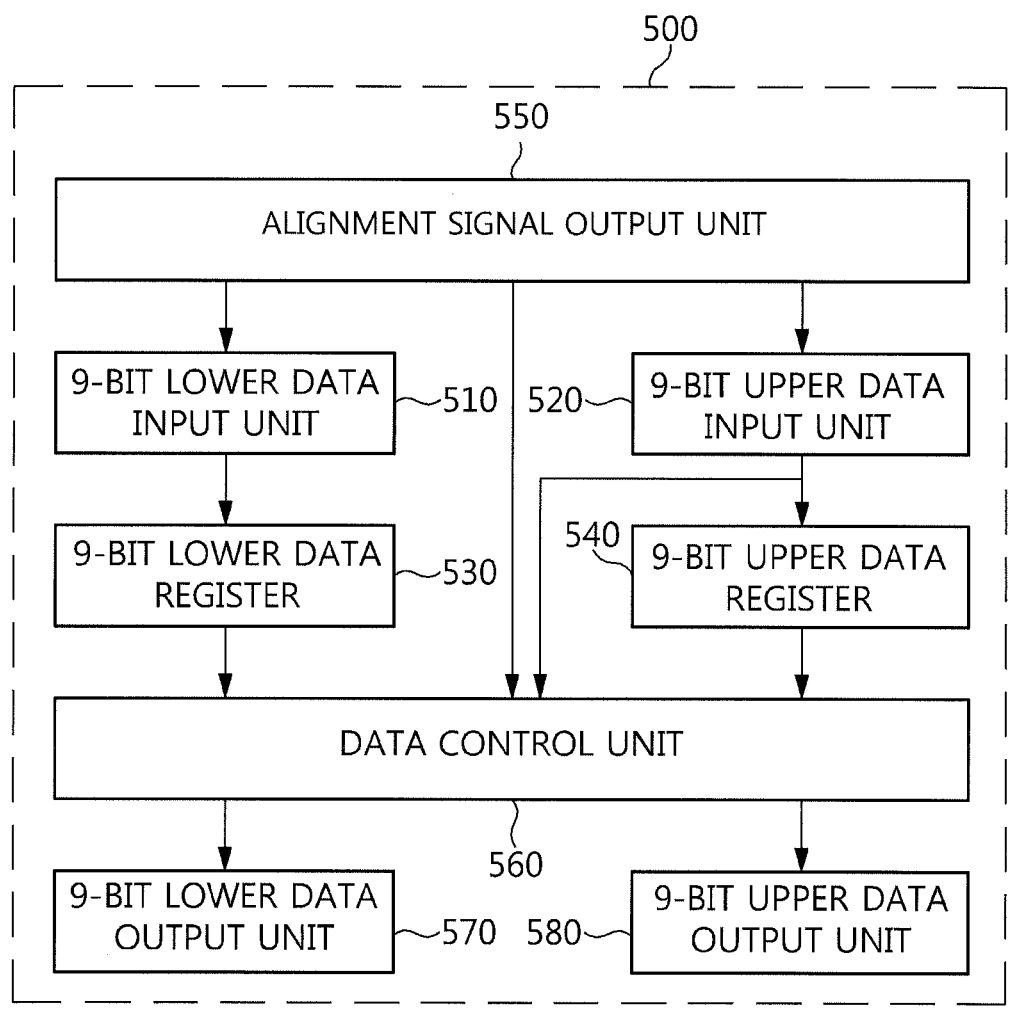
FIG. 3 shows the configuration of a lane data alignment unit used in the deskew apparatus for PCI Express according to an embodiment of the present invention PCI Express.
Figure 4:
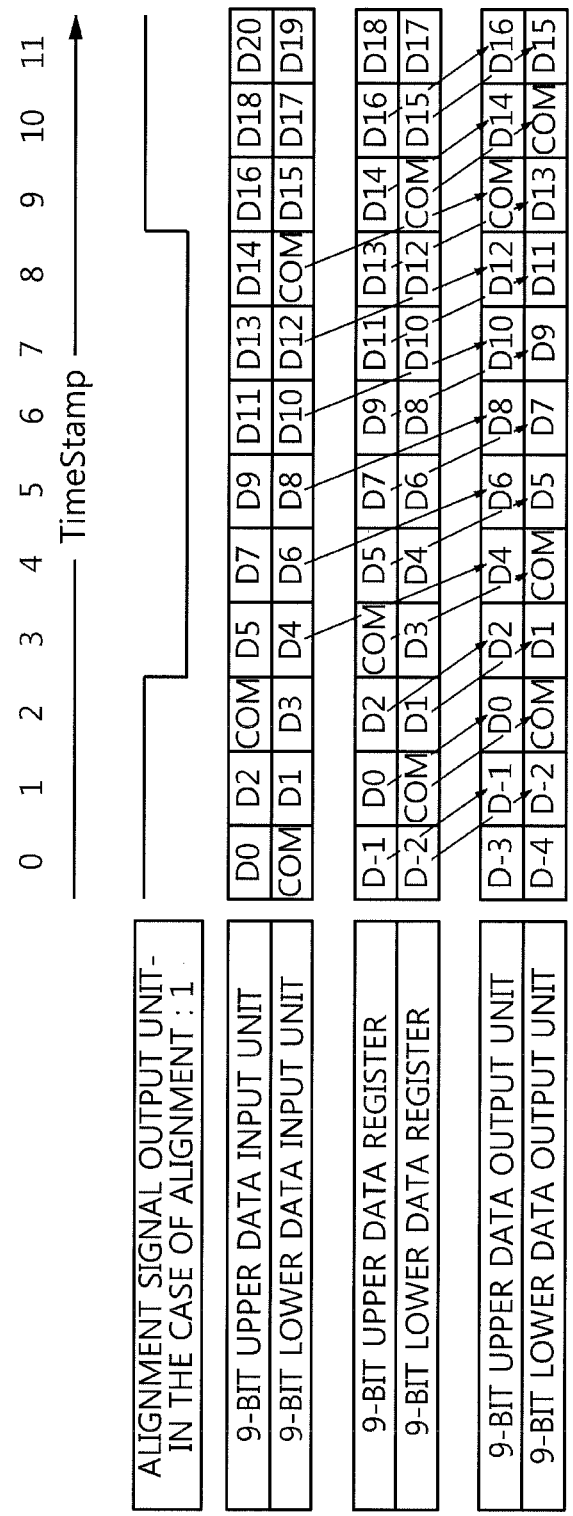
FIG. 4 illustrates the operation of the lane data alignment unit according to an embodiment of the present invention.
Figure 5:
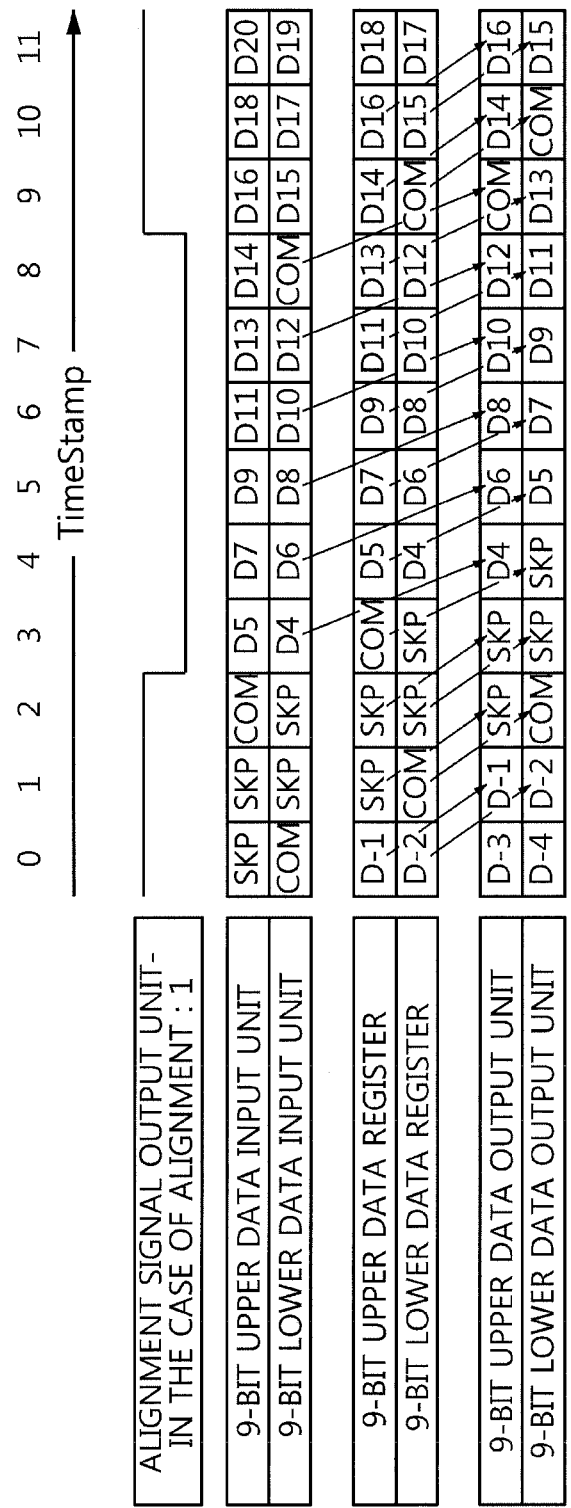
FIG. 5 illustrates that an SKP symbol unnecessarily added because of the operation of the lane data alignment unit is removed in an embodiment of the present invention.
Figure 6:
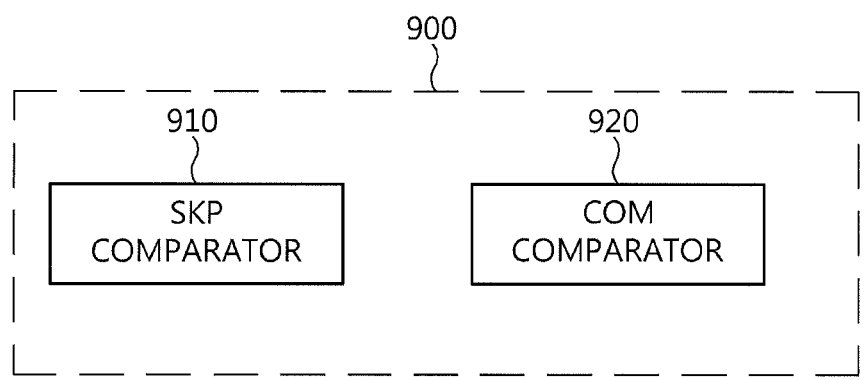
FIG. 6 shows the configuration of a lane data detection unit that is used in a deskew apparatus for PCI Express according to an embodiment of the present invention.

FIG. 2 shows the configuration of a deskew apparatus for PCI Express according to an embodiment of the present invention, FIG. 3 shows the configuration of a lane data alignment unit that is used in the deskew apparatus for PCI Express according to an embodiment of the present invention, FIG. 4 shows the operation of the lane data alignment unit according to an embodiment of the present invention, FIG. 5 illustrates that an SKP symbol unnecessarily added because of the operation of the lane data alignment unit is removed in an embodiment of the present invention, and FIG. 6 shows the configuration of a lane data detection unit that is used in a deskew apparatus for PCI Express according to an embodiment of the present invention.

Referring to FIG. 2, the deskew apparatus for PCI Express according to the present invention includes a lane data input unit 100 for receiving 18-bit data from each of the lanes of PCI Express, a lane data alignment unit 500 for aligning the 18-bit data using a COM symbol, a lane data detection unit 900 for detecting a change in a state of alignment of the 18-bit data attributable to the deletion or addition of an SKP symbol when the 18-bit data is aligned and then performing synchronization between the lanes based on the results of the detection, and a lane data output unit 1300. Therefore, the deskew apparatus can compensate for not only static skew but also dynamic skew.

That is, in the deskew apparatus for PCI Express according to the present invention, 18-bit data received via the lane data input unit 100 is aligned using the data alignment unit 500, and is then sent to the lane data detection unit 900. The lane data detection unit 900 detects a change in the 18-bit data from an SKP symbol to a symbol other than an SKP symbol, and sends information about the detected change to a plurality of additional lane data detection units 1000, 1100 and 1200. Here, the lane data detection unit 900 has approximately half of the registers of the additional lane data detection units 1000, 1100 and 1200. The content finally registered in the lane data detection unit 900 is output to the lane data output unit 1300.

The 18-bit data received by each of the additional lane data input units 200, 300 and 400 is aligned by a corresponding additional lane data alignment unit 600, 700 or 800, and is then sent to a corresponding additional lane data detection unit 1000, 1100 or 1200. The additional lane data detection unit 1000, 1100 or 1200 detects a change in the 18-bit data from an SKP symbol to a symbol other than an SKP symbol in its lane, and synchronizes a register to which the detected data will be output based on a signal received from the lane data detection unit 900. The data synchronized in the additional lane data detection unit 1000, 1100 or 1200 is output to a corresponding additional lane data output unit 1400, 1500 or 1600. The numbers of additional lane data input units 200, 300 and 400, additional lane data alignment units 600, 700 and 800, additional lane data detection units 1000, 1100 and 1200, and additional lane data output units 1400, 1500 and 1600 may be increased or decreased depending on the number of lanes of PCI Express.

As shown in FIG. 3, the lane data alignment unit 500 includes a 9-bit lower data input unit 510, a 9-bit upper data input unit 520, a 9-bit lower data register 530, a 9-bit upper data register 540, an alignment signal output unit 550, a data control unit 560, a 9-bit lower data output unit 570, and a 9-bit upper data output unit 580 in order to align bytes between the lanes.

The 9-bit lower data input unit 510 receives 9-bit data, including a COM symbol, which is selected from 18-bit data. The 9-bit upper data input unit 520 receives 9-bit data, including a symbol which is not a COM symbol, which is selected from the 18-bit data. The 9-bit lower data register 530 stores the content of the lower data input unit 510, and the 9-bit upper data register 540 stores the content of the upper data input unit 520.

The alignment signal output unit 550 determines that the received data has been aligned if 9-bit data input to the 9-bit lower data input unit 510 is a COM symbol and 9-bit data input to the 9-bit upper data input unit 520 is a symbol other than a COM symbol. In this case, the data control unit 560 sends the content of the 9-bit lower data register 530 to the 9-bit lower data output unit 570 and the content of the 9-bit upper data register 540 to the 9-bit upper data output unit 580. Meanwhile, the alignment signal output unit 550 determines that the received data has not been aligned if 9-bit data input to the 9-bit lower data input unit 510 is not a COM symbol and 9-bit data input to the 9-bit upper data input unit 520 is a COM symbol. In this case, the data control unit 560 sends the content of the 9-bit lower data register 530 to the 9-bit upper data output unit 580 and the content of the 9-bit upper data register 540 to the 9-bit lower data output unit 570.

The operation of the lane data alignment unit 500 will now be described in detail with reference to FIG. 4. The alignment signal output unit 550 lowers the level of the alignment signal to 0 from TimeStamp 2 at which the value of the 9-bit upper data input unit 520 is a COM symbol and the value of the 9-bit lower data input unit 510 is not a COM symbol, and raises the level of the alignment signal to 1 from TimeStamp 8 at which the value of the 9-bit upper data input unit 520 is not a COM symbol and the value of the 9-bit lower data input unit 510 is a COM symbol. The data control unit 560 combines the values of the 9-bit upper data register 540, the 9-bit lower data register 530 and the 9-bit lower data input unit 510, and sends the resulting value to the 9-bit upper data output unit 580 and the 9-bit lower data comparator 570. Meanwhile, although the COM symbol input to the 9-bit lower data input unit 510 at TimeStamp 8 was output to the 9-bit upper data register 540 at TimeStamp 9, it is redundantly output at TimeStamp 10 because the unit of the alignment has been changed. However, even though a reset consecutively occurs in a descrambler, there is no problem because the COM symbol acts as a reset signal of the descrambler. Furthermore, a symbol D3 stored in the 9-bit lower data register 530 at TimeStamp 3 is removed from the data after TimeStamp 4 at which the value of the symbol D3 is output. The reason for this is that the case in which a change in a state of alignment using a COM symbol occurs is nothing but the case in which previous symbols are SKP symbols and one SKP symbol is removed or added. Accordingly, the case in which the unit of the alignment is changed by the addition of an SKP symbol is illustrated in FIG. 5. The symbol D3 removed in FIG. 4 corresponds to an SKP symbol in FIG. 5. In the PCI Express standard, the removal of an SKP symbol is not a problem because all SKP sequence sets, each including 1 to 5 SKP symbols, can be recognized.

The lane data detection unit 900 detects a change in a state of alignment of 18-bit data attributable to the deletion or addition of an SKP symbol when the 18-bit data is aligned, and performs synchronization between the lanes based on the results of the detection.

For this purpose, the lane data detection unit 900 includes an SKP comparator 910 and a COM comparator 920, as shown in FIG. 6. The SKP comparator 910 outputs the value of an SKP symbol depending on the addition or deletion of the SKP symbol that occurs when 18-bit data is aligned. The COM comparator 920 outputs the value of a COM symbol corresponding to the output value of the SKP symbol. The lane data detection unit 900 performs synchronization by comparing the output value of the SKP symbol with the value of the COM symbol and changing the value of the SKP symbol to the value of the COM symbol if, as a result of the comparison, it is determined that the requirement of an SKP sequence set is not satisfied. Alternatively, the lane data detection unit 900 performs synchronization by comparing the output value of the SKP symbol with the value of the COM symbol, and changing the value of the SKP symbol to the value of the SKP symbol instead of the value of the COM symbol if, as a result of the comparison, it is determined that an overlap occurs between SKP sequence sets.

The lane data output unit 1300 outputs significant data which has been aligned by the lane data alignment unit 500 and whose change in a COM symbol and an SKP symbol have been detected by the lane data detection unit 900. For example, the number of cases in which a 7×2×9 bit data selector may select data to be output to the 9-bit upper data output unit 580 is a probability of 1/7 using only the 9-bit register for storing data input to the 9-bit upper data input unit 520. The number of cases in which the 7×2×9 bit data selector may select data to be output to a 9-bit upper data comparator also has a probability of 1/7.

Figure 7:
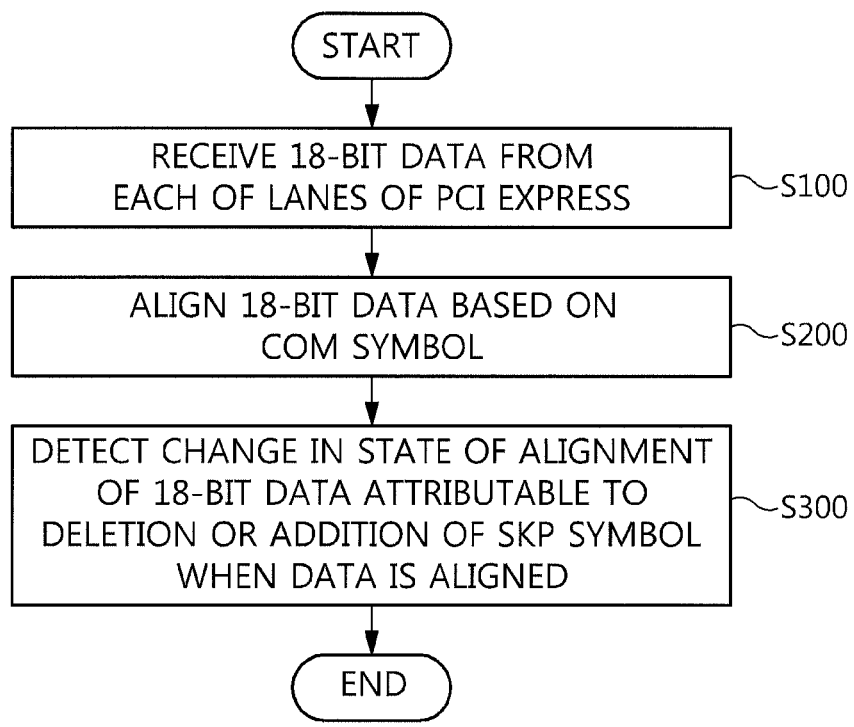
FIG. 7 is a flowchart illustrating the sequence of a method of compensating for the deskew of PCI Express according to an embodiment of the present invention.
Figure 8:
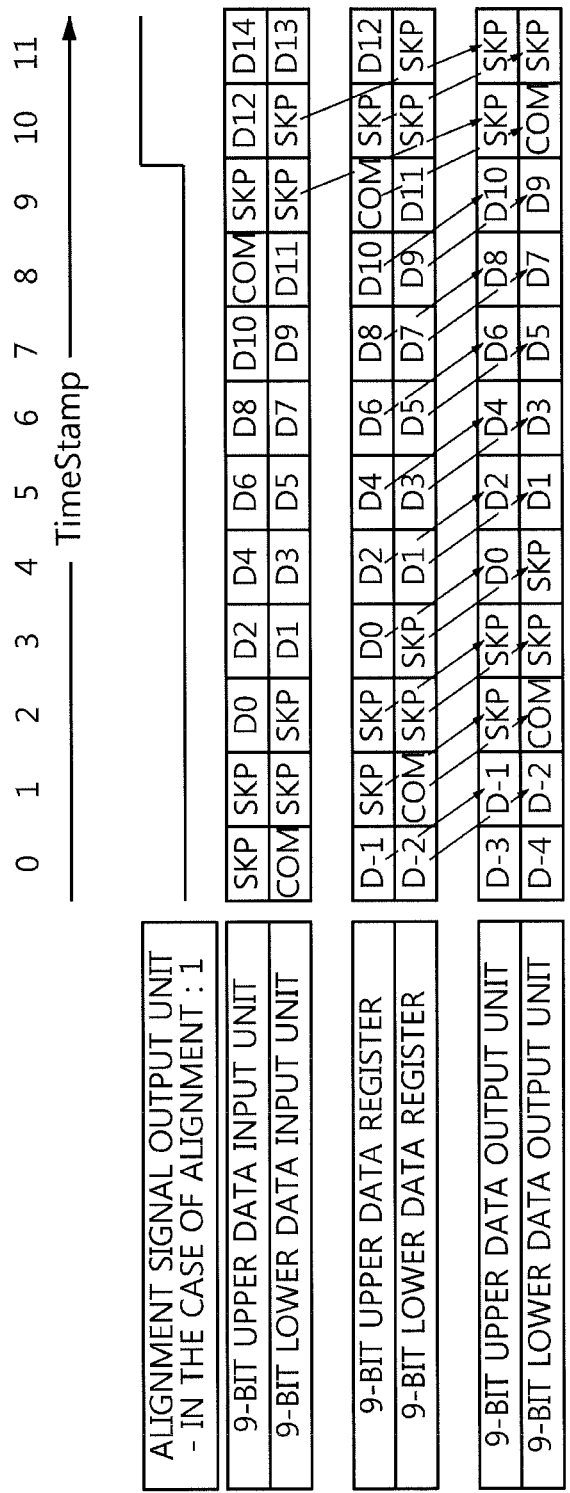
FIG. 8 illustrates that symbols are lost when data is aligned using only a COM symbol in the conventional art.
Figure 9:
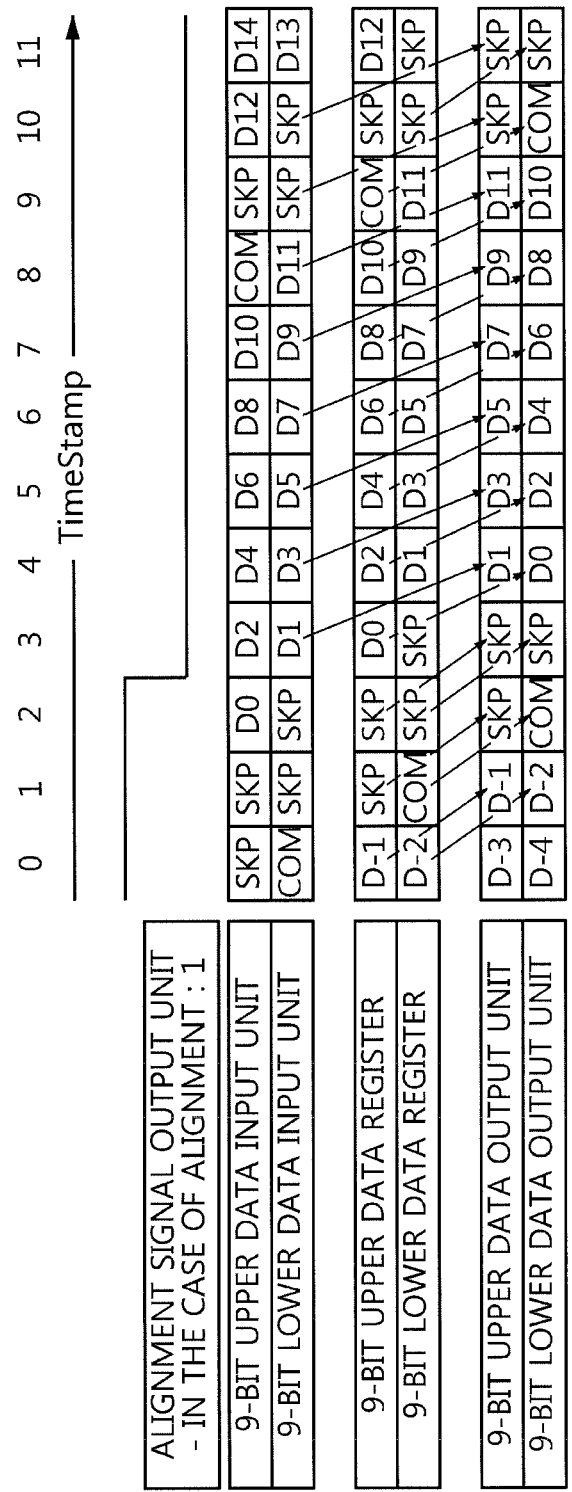
FIG. 9 illustrates that data is not lost when a change in the SKP symbol is detected and then a state of alignment is changed in the method of compensating for the deskew of PCI Express according to the embodiment of the present invention.
Figure 10:
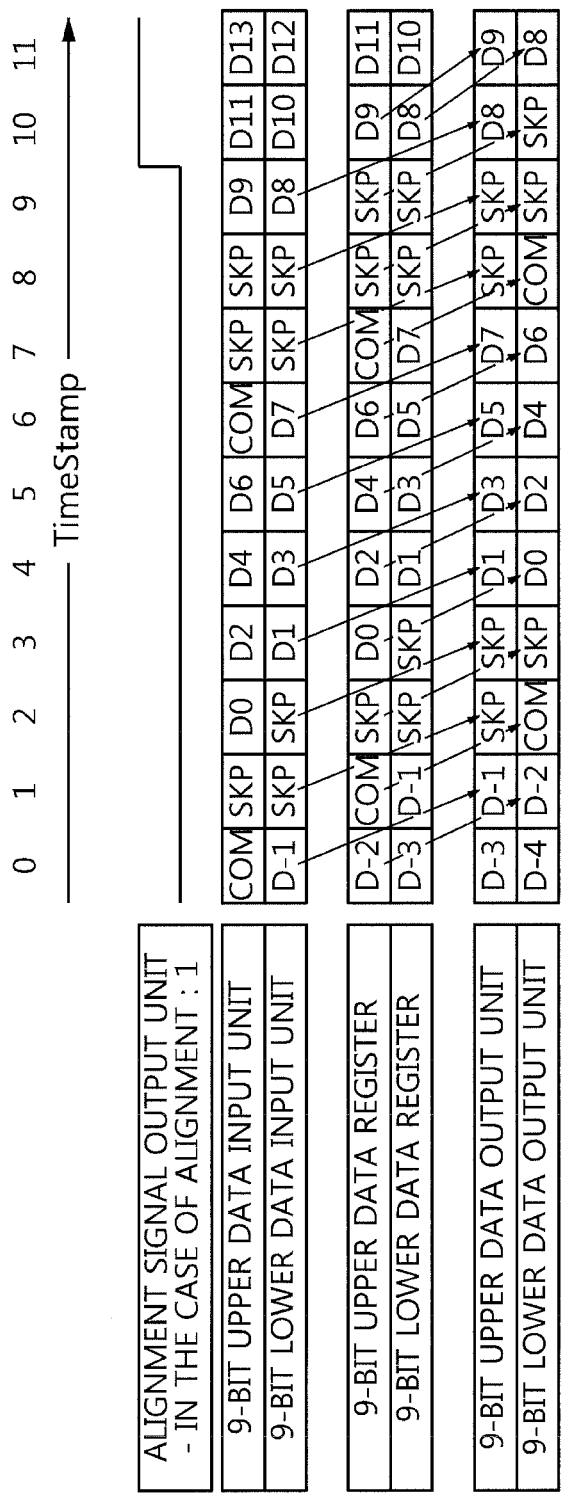
FIG. 10 shows a problem that occurs because a symbol is added when the state is changed from a state of non-alignment to a state of alignment.
Figure 11:
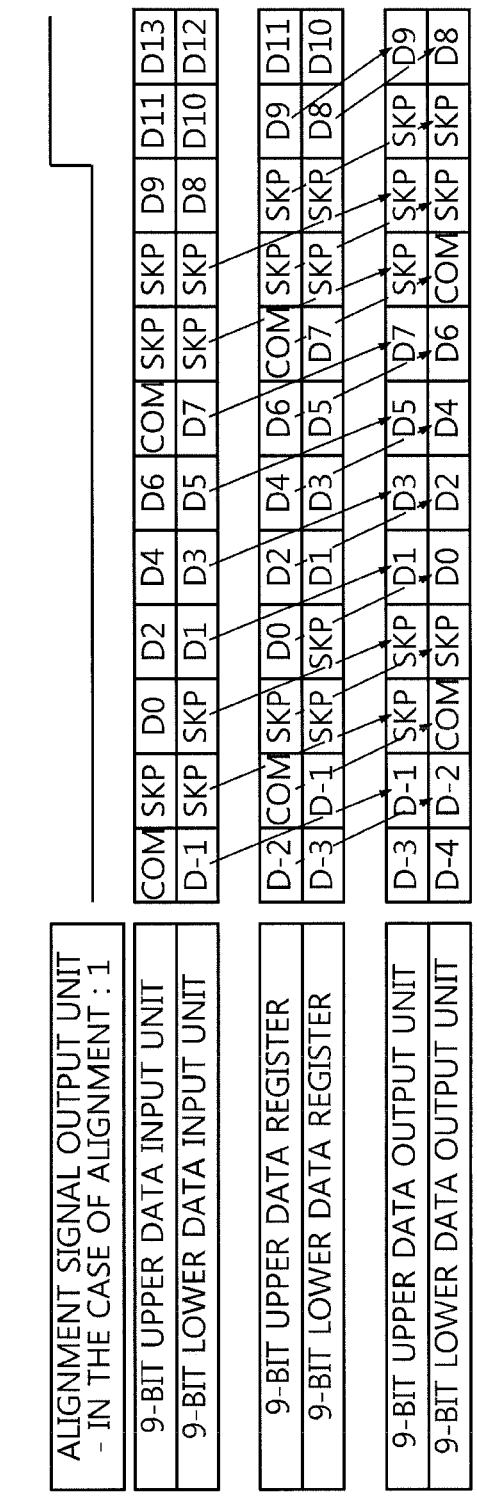
FIG. 11 shows that a problem that occurs because of the addition of a symbol when the state is changed from a state of non-alignment to a state of alignment is solved in the method of compensating for the deskew of PCI Express according to an embodiment of the present invention.
Figure 12:
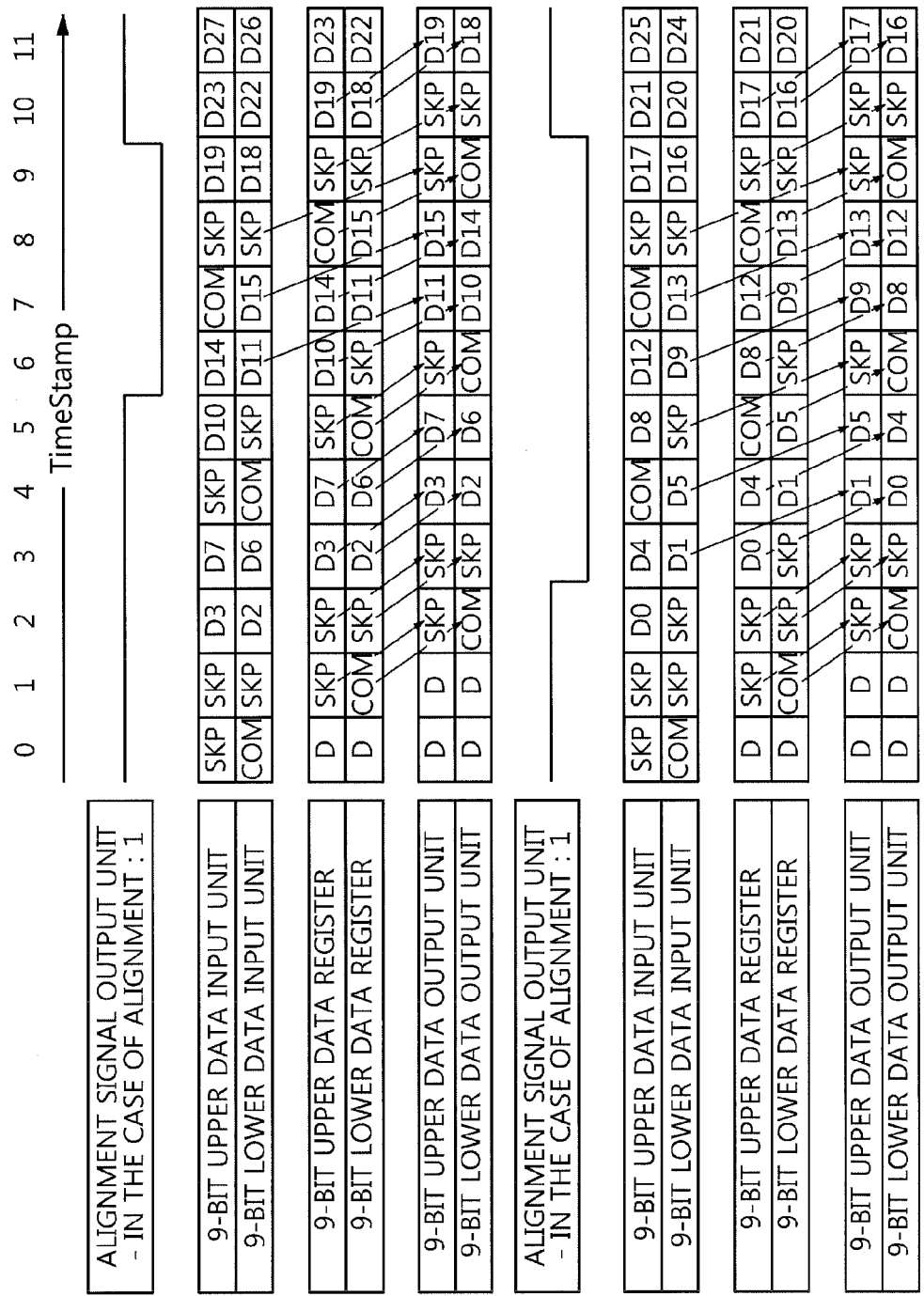
FIG. 12 illustrates that the dynamic skew between lanes is removed when a lane is changed from a state of alignment to a state of non-alignment and then changed to a state of alignment by the data alignment unit in the method of compensating for the deskew of PCI Express according to an embodiment of the present invention.
Figure 13:
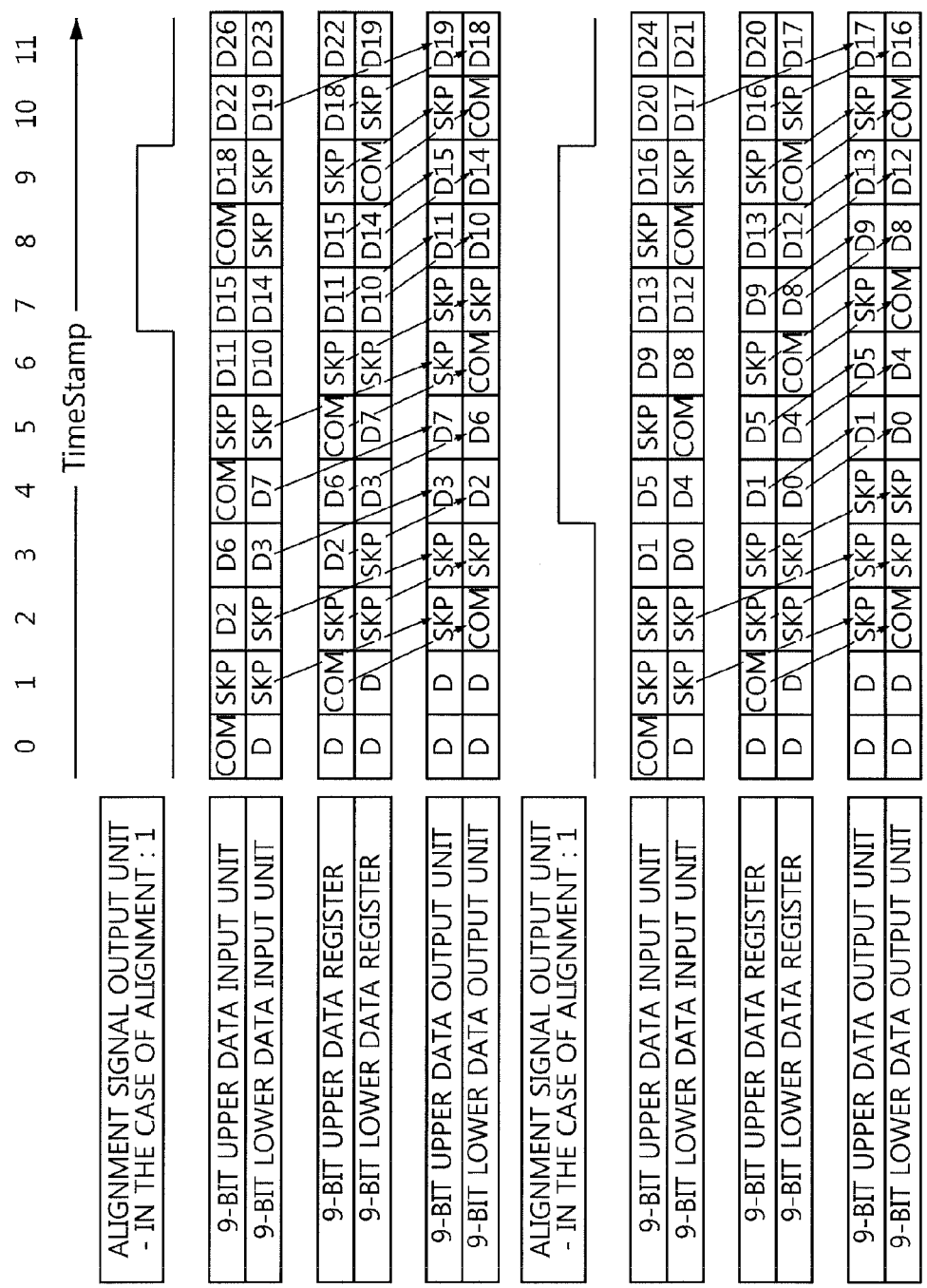
FIG. 13 illustrates that the dynamic skew between lanes is removed when a lane is changed from a state of non-alignment to a state of alignment and then changed to a state of non-alignment by the data alignment unit in the method of compensating for the deskew of PCI Express according to an embodiment of the present invention.
Figure 14:
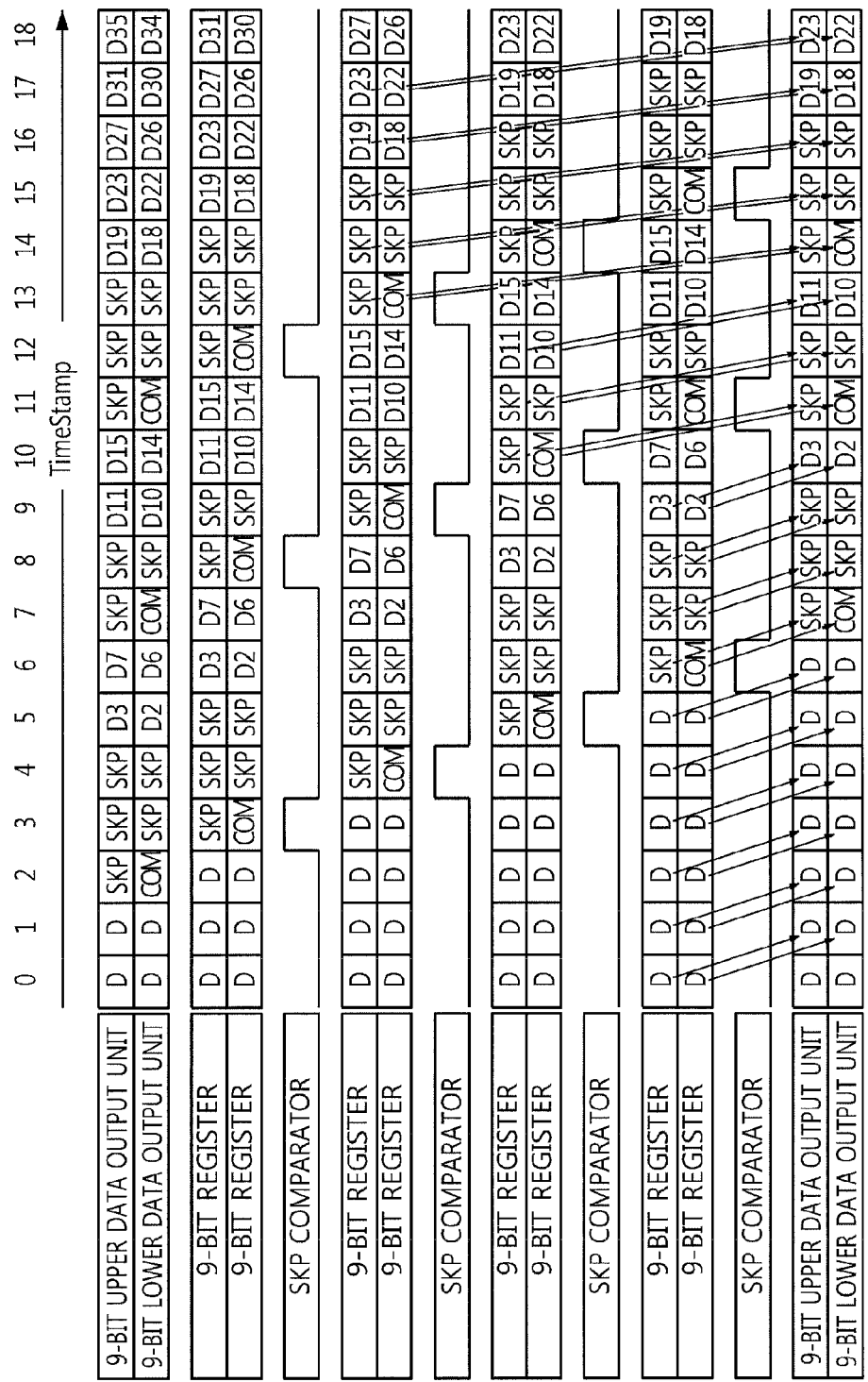
FIGS. 14 and 15 illustrate a problem in which data is lost when a conventional method of removing the skew between lanes based on the comparison of a COM symbol is used.
Figure 15:
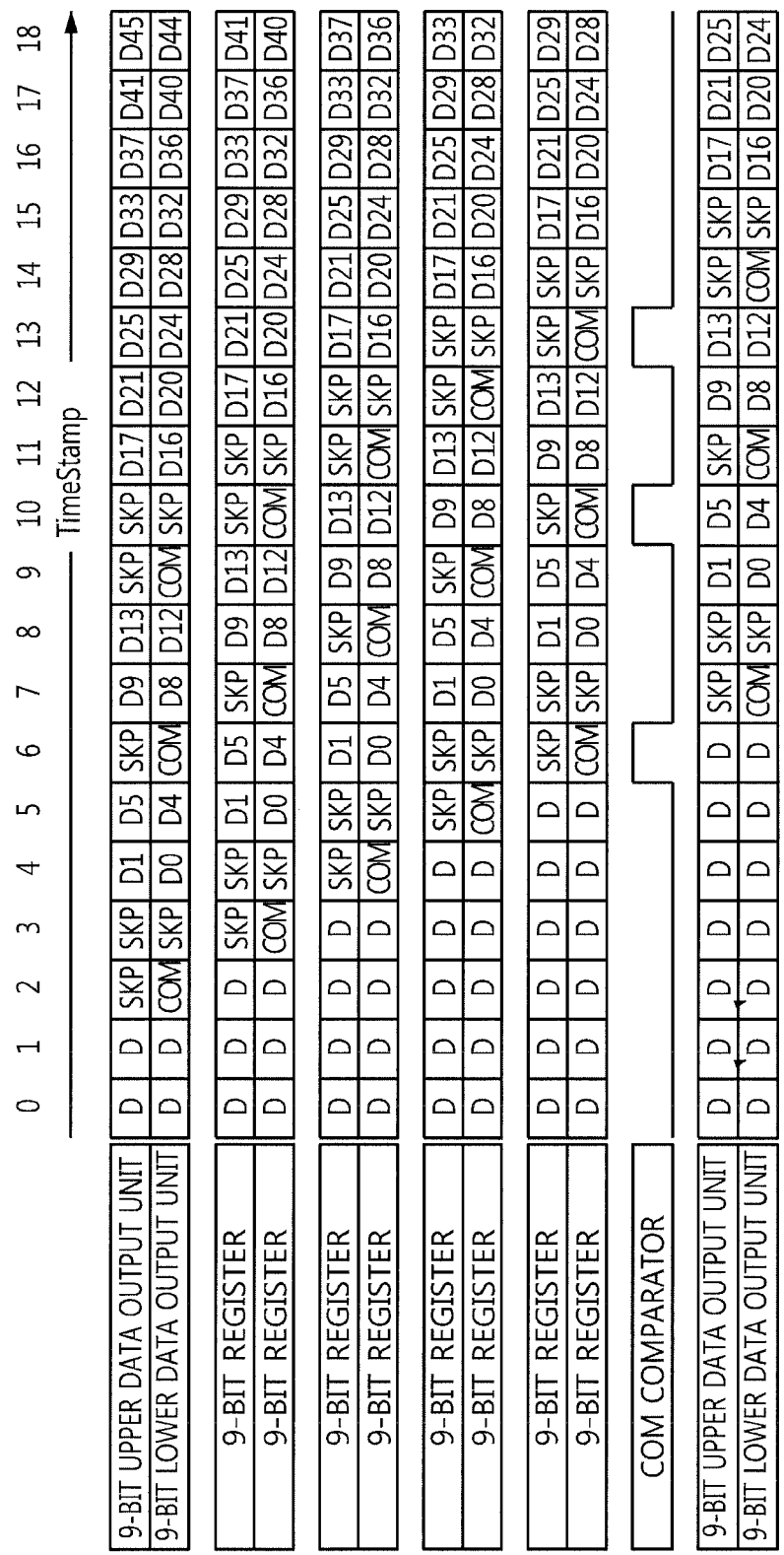
Figure 16:
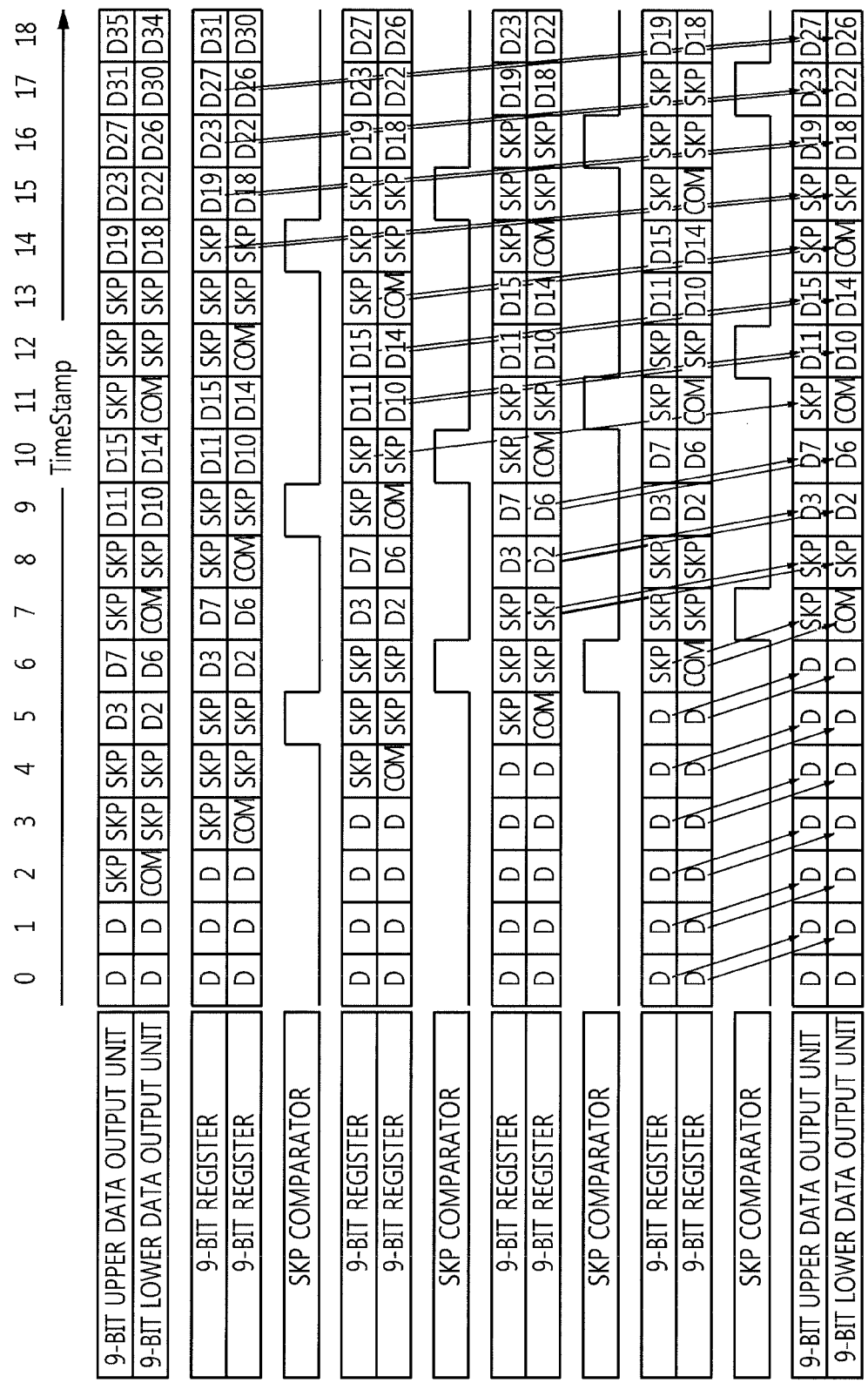
FIGS. 16 and 17 illustrate that a problem in which data is lost is solved according to the method of compensating for the deskew of PCI Express according to an embodiment of the present invention.
Figure 17:
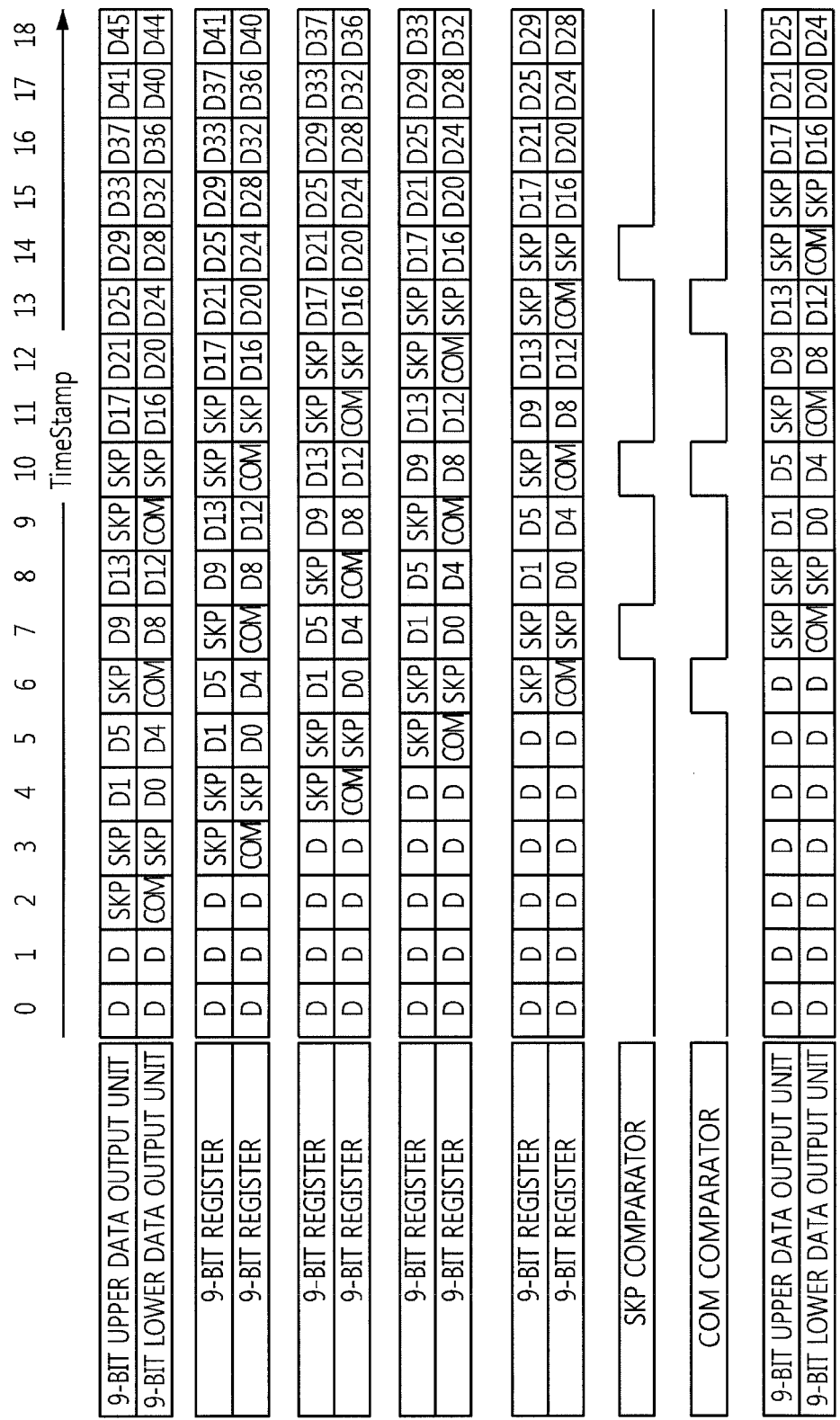
Figure 18:
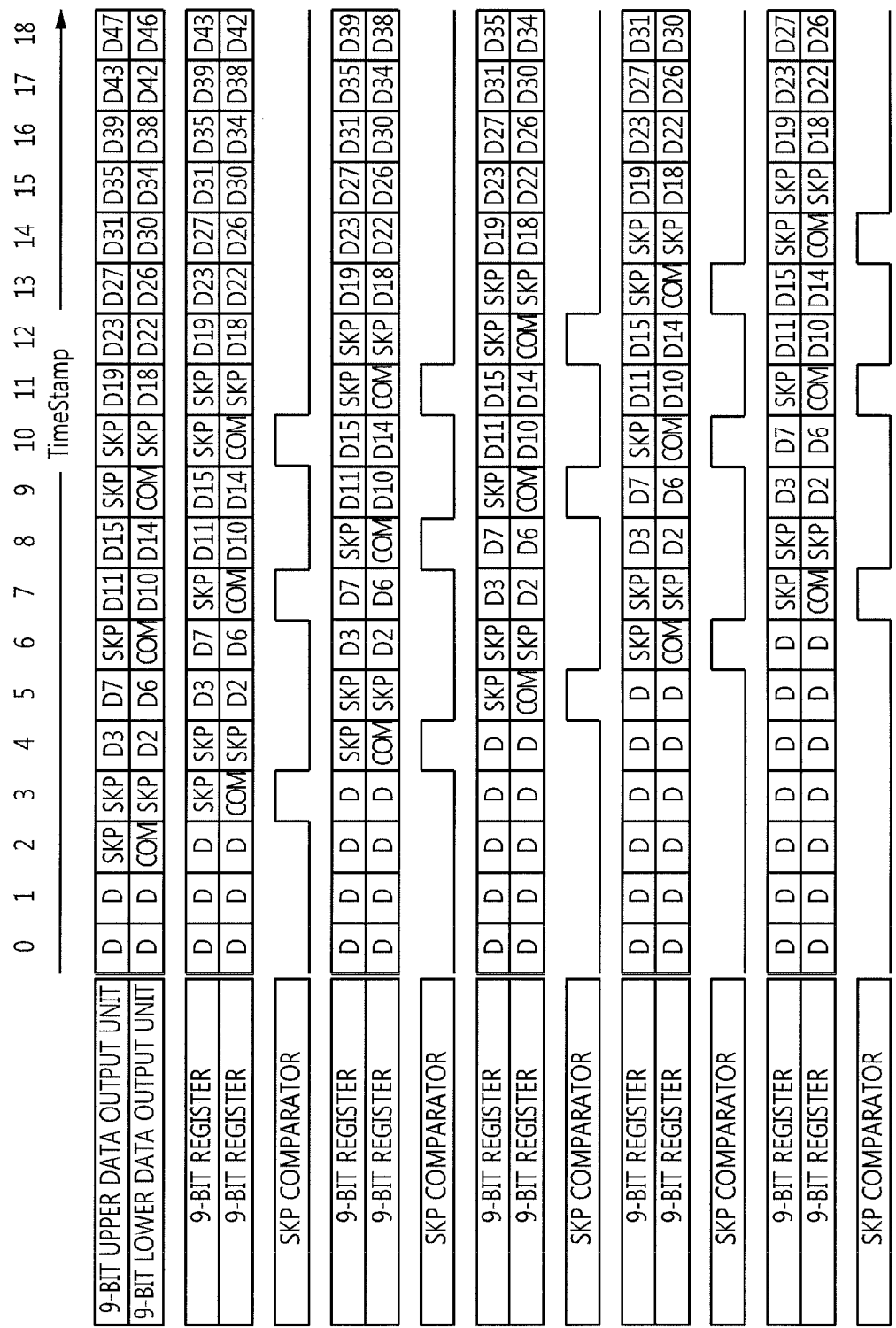
FIGS. 18 and 19 illustrate a problem that occurs because of the addition of a symbol when deskew is processed using a COM symbol according to the conventional art.
Figure 19:
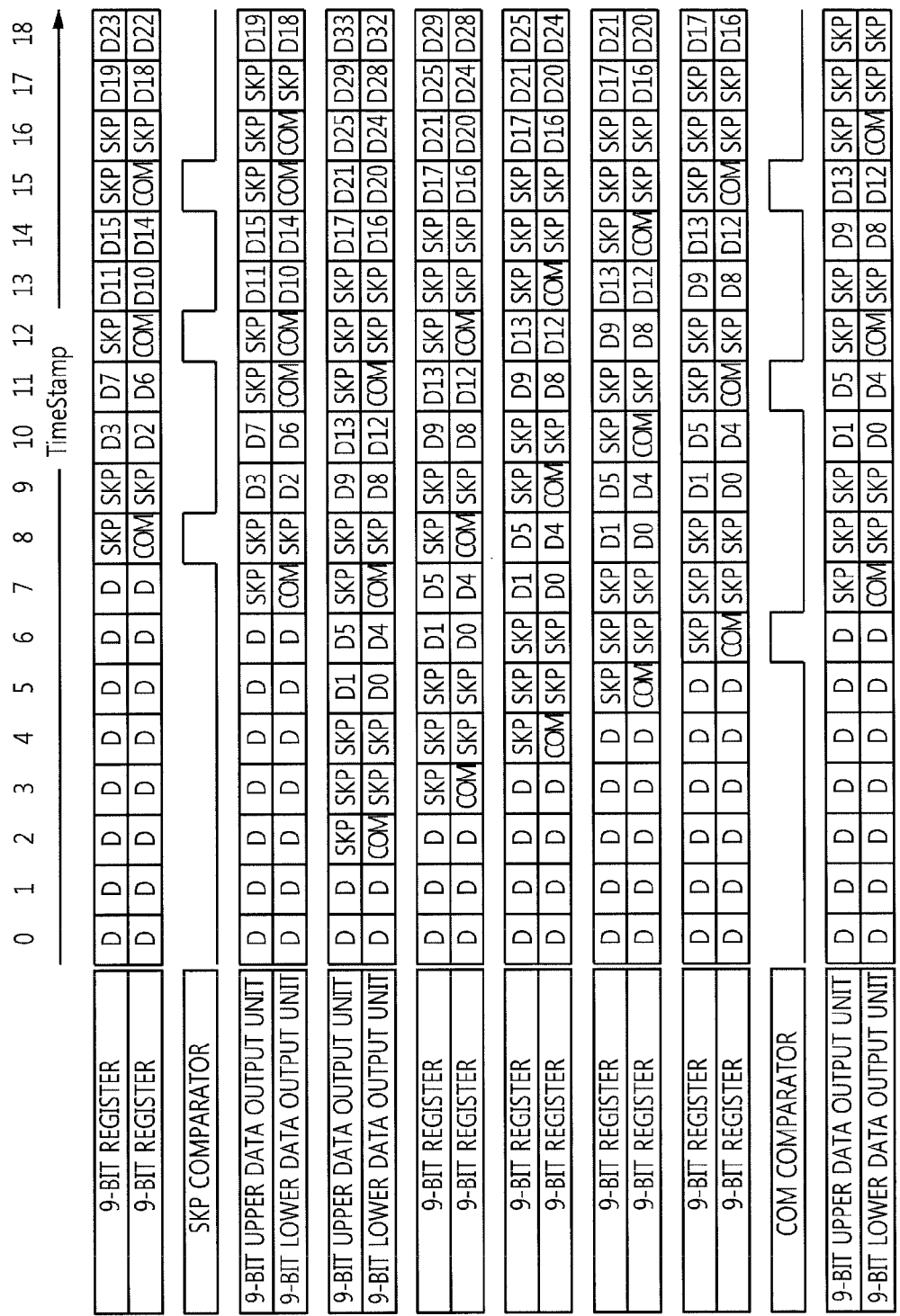
Figure 20:
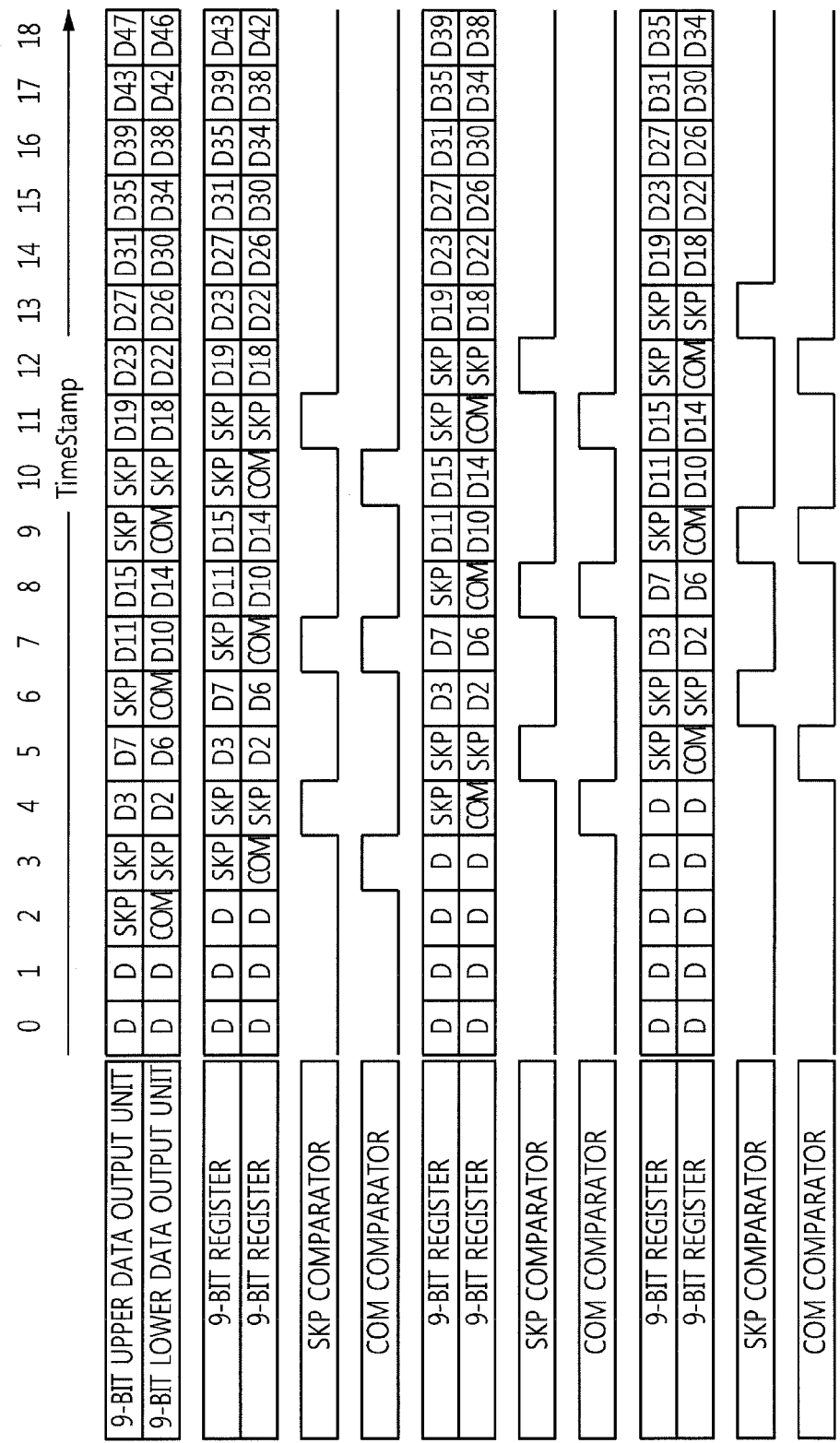
FIGS. 20, 21, and 22 illustrate that a problem attributable to the addition of a symbol is solved according to the method of compensating for the deskew of PCI Express according to an embodiment of the present invention.
Figure 21:
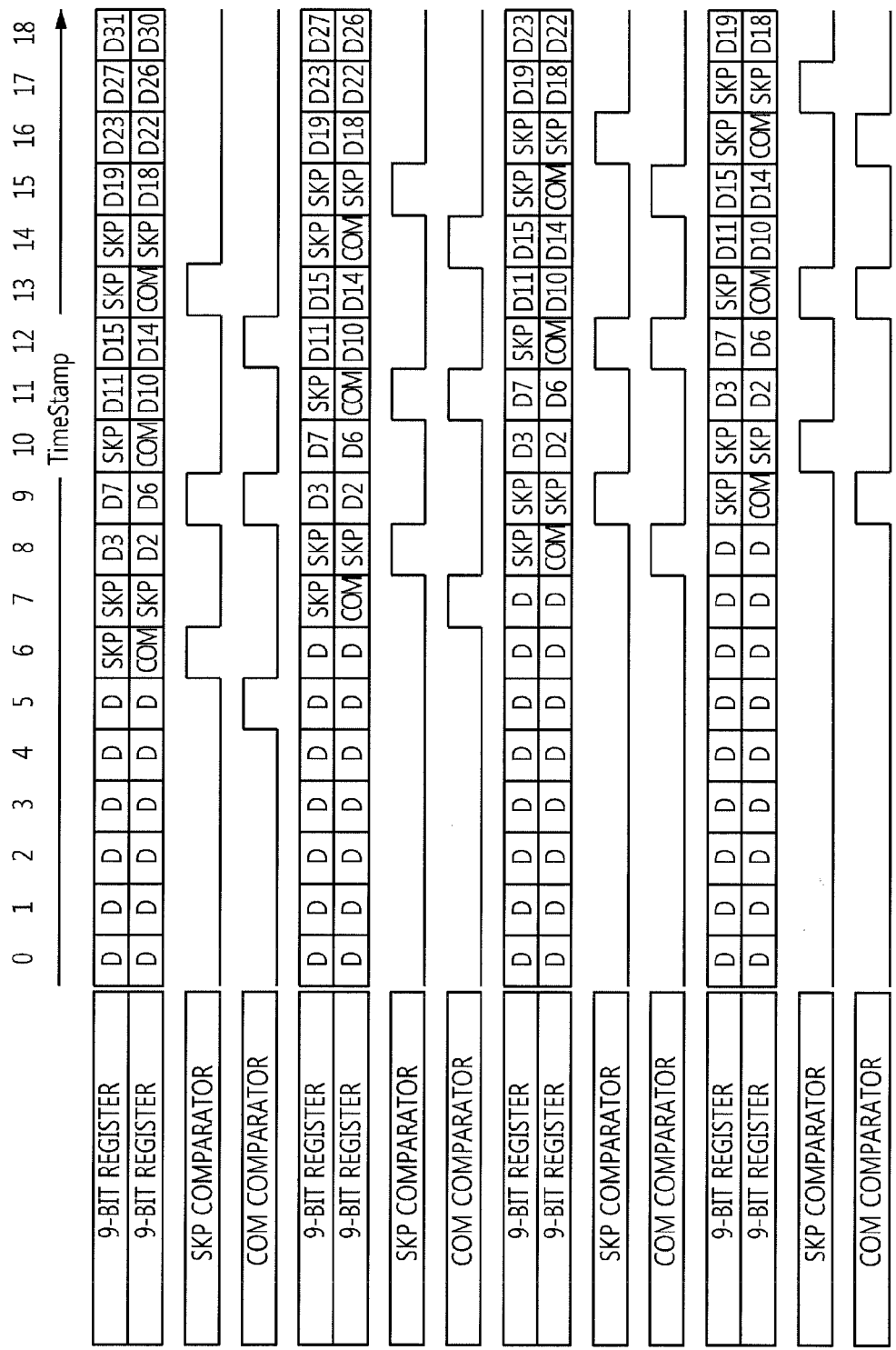
Figure 22:
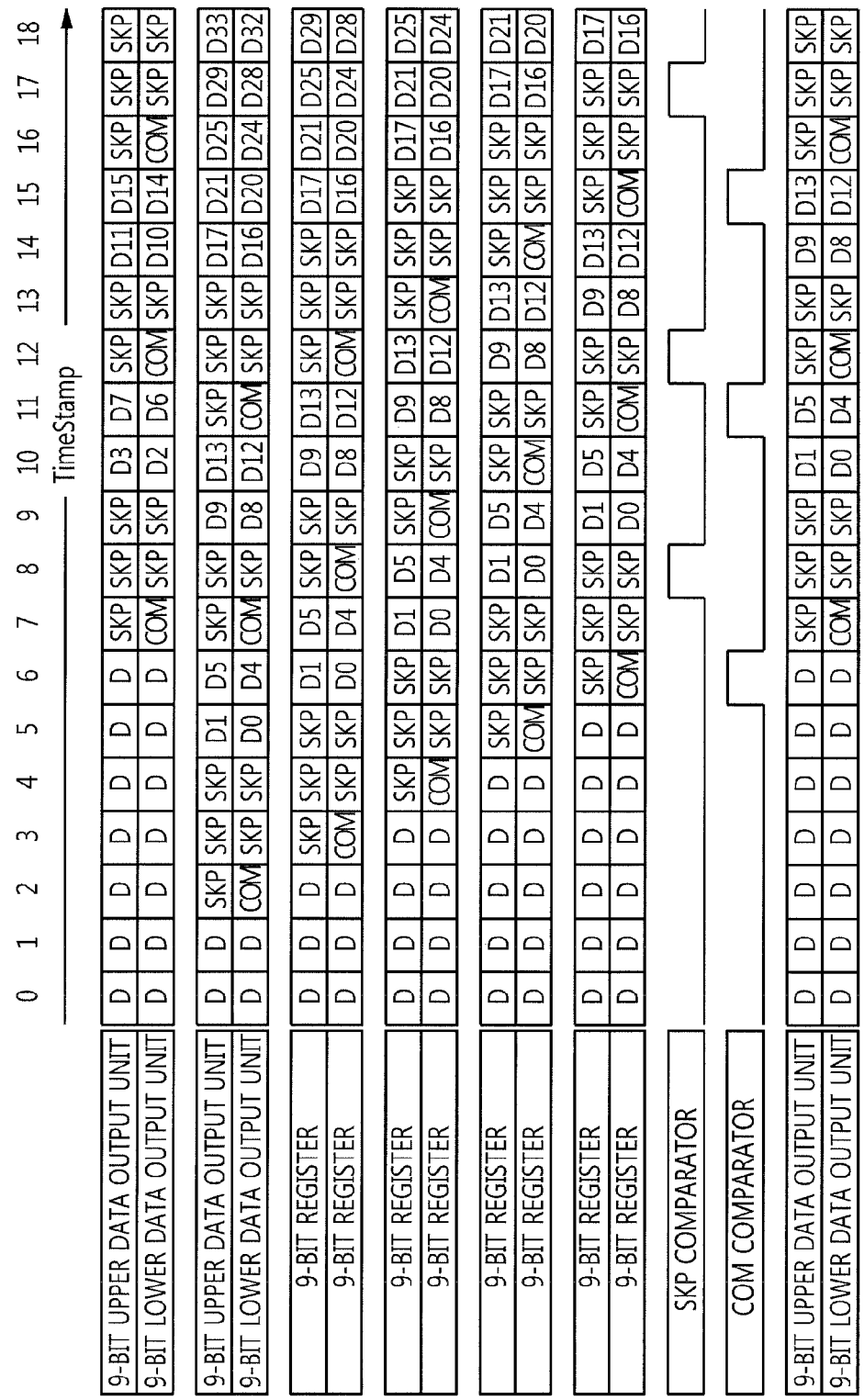

FIG. 7 is a flowchart illustrating a method of compensating for the deskew of PCI Express according to an embodiment of the present invention, FIG. 8 illustrates that symbols are lost when data is aligned using only a COM symbol in the prior art, FIG. 9 illustrates that data is not lost when a state of alignment is changed by detecting a change in the SKP symbol in the method of compensating for the deskew of PCI Express according to the embodiment of the present invention, FIG. 10 shows a problem that occurs because a symbol is added when the state is changed from a state of non-alignment to a state of alignment, FIG. 11 shows a problem that occurs because of the addition of a symbol when the state is changed from a state of non-alignment to a state of alignment is solved in the method of compensating for the deskew of PCI Express according to an embodiment of the present invention, FIG. 12 illustrates that the dynamic skew between lanes is removed when a lane is changed from a state of alignment to a state of non-alignment and then changed to a state of alignment by the data alignment unit in the method of compensating for the deskew of PCI Express according to an embodiment of the present invention, FIG. 13 illustrates that the dynamic skew between lanes is removed when a lane is changed from a state of non-alignment to a state of alignment and then changed to a state of non-alignment by the data alignment unit in the method of compensating for the deskew of PCI Express according to an embodiment of the present invention, FIGS. 14 and 15 illustrate a problem in which data is lost when a conventional method of removing the skew between lanes based on the comparison of a COM symbol is used, FIGS. 16 and 17 illustrate that a problem in which data is lost is solved according to the method of compensating for the deskew of PCI Express according to an embodiment of the present invention, FIGS. 18 and 19 illustrate a problem that occurs because of the addition of a symbol when deskew is processed using a COM symbol according to the conventional art, and FIGS. 20, 21, and 22 illustrate that a problem attributable to the addition of a symbol is solved according to the method of compensating for the deskew of PCI Express according to an embodiment of the present invention.

As shown in FIG. 7, in the method of compensating for the deskew of PCI Express according to the present invention, first, the lane data input unit 100 receives 18-bit data from each of the lanes of PCI Express at step S100. The lane data alignment unit 500 aligns the 18-bit data at step S200. The lane data detection unit 900 detects a change in a state of alignment of the 18-bit data attributable to the deletion or addition of an SKP symbol that occurs when the 18-bit data is aligned and performs synchronization between the lanes based on the results of the detection at step S300. Examples in which the problems occurring in the prior art are solved by the present invention will be described in detail below.

FIG. 8 shows the problem of the prior art in which a symbol is lost when data is aligned. Although the data of the 9-bit upper data input unit 520 and the data of the 9-bit lower data input unit 510 are not aligned from TimeStamp 2 because of the addition of an SKP symbol, the data is aligned based only on a COM symbol, so that the data is lost. These results affect a state of alignment when an SKP sequence set is received at TimeStamp 8, thereby resulting in the loss of a symbol D11 in the 9-bit lower data register 530 at TimeStamp 9. If the data is significant data within a packet, the packet is lost. Accordingly, in the present invention, in order to prevent this problem, a criterion for alignment is not based only on a COM symbol, but a change in the unit of alignment attributable to the addition or deletion of an SKP symbol is detected, which is illustrated in FIG. 9.

As illustrated in FIG. 9, when a state of alignment is changed to a state of non-alignment because of the addition of an SKP symbol at TimeStamp 2, the alignment signal output unit 550 detects the change and lowers the level of the alignment signal to 0. There is no loss of the symbol D11 in FIG. 9 because a state of non-alignment is maintained thereafter. Here, if a state of alignment is changed by the addition of an SKP symbol, the case in which a state of non-alignment is changed to a state of alignment should be detected in addition to the case in which a state of alignment is changed to a state of non-alignment. If a state of non-alignment is changed to a state of alignment, a problem attributable to the addition of a symbol may occur, which is illustrated in FIG. 10.

In FIG. 10, a change from a state of non-alignment to a state of alignment attributable to the addition of an SKP symbol may be detected by checking the values of the 9-bit lower data input unit 510 and the 9-bit upper data register 540 at TimeStamp 9, and the change is incorporated after TimeStamp 10. At this time, a symbol is added. In this case, the symbol D8 is added. The addition of the symbol affects the subsequent descrambler of the deskew apparatus of the present invention, thereby resulting in the loss of data. Therefore, there is a need for a method of preventing the loss of data. FIG. 11 shows the method of preventing the loss of data.

In FIG. 11, the value of the 9-bit lower data input unit 510 is not incorporated and instead an SKP symbol is used in the 9-bit upper data register 540 at TimeStamp 10. The number of SKP symbols included in an SKP sequence set in the PCI Express standard is not limited to 3, but one to five symbols included in the SKP sequence set can be detected. Furthermore, the addition or deletion of an SKP symbol does not affect the descrambler. As a result, data is not lost.

FIG. 12 shows the operation of the present invention when a state of alignment is changed to a state of non-alignment and then changed to a state of alignment again because of the addition or deletion of an SKP symbol. FIG. 12 shows two lanes, and a skew may occur dynamically when the addition or deletion of an SKP symbol in each lane is performed individually. Here, when the configuration of the present invention is used, the dynamic skew attributable to the addition or deletion of an SKP symbol is removed in each lane and data is sequentially aligned.

FIG. 13 shows the operation of the present invention when a state of non-alignment is changed to a state of alignment and then changed to a state of non-alignment again because of the addition or deletion of an SKP symbol. FIG. 13 shows two lanes, and a skew may occur dynamically when the addition or deletion of an SKP symbol in each lane is performed individually. Here, if the configuration of the present invention is used, the dynamic skew attributable to the addition or deletion of an SKP symbol is removed in each lane and data is sequentially aligned.

FIGS. 14 and 15 show a problem that occurs when the skew between lanes is removed using a COM symbol because of a skew that occurs dynamically when the addition or deletion of an SKP symbol is individually performed in each lane if a method of removing the skew between lanes by comparing COM symbols with each other is used. FIGS. 14 and 15 illustrate how if a COM symbol is synchronized based on the results of a COM symbol detected by the additional lane data detection units 1000, 1100 and 1200 and the lane data detection unit 900, symbols D6 and D7 are lost at TimeStamp 11 and symbols D14 and D15 are lost at TimeStamp 14. That is, if synchronization is performed using a COM symbol, data is lost, thereby resulting in a packet error. Furthermore, synchronization is not performed on output data. In order to solve these problems, the present invention uses a method of detecting a change in the SKP symbol, that is, a change attributable to the deletion or addition of an SKP symbol, instead of a method of detecting a COM symbol.

FIGS. 16 and 17 illustrate that the problem of data loss shown in FIGS. 14 and 15 is solved by the present invention. Normally, the 9-bit upper data output unit 520 and the 9-bit lower data output unit 510 output the values of the 9-bit lower data register 530 and the 9-bit upper data register 540, but output the values of the 9-bit lower data register 530 and the 9-bit upper data register 540 in which there has been a change in an SKP symbol from TimeStamp 7 at which the SKP comparator 910 detected a change in the SKP symbol. Thereafter, the 9-bit upper data output unit 520 and the 9-bit lower data output unit 510 output the values of the 9-bit upper data register 540 and the 9-bit lower data register 530 from TimeStamp 10 at which the SKP comparator 910 detects a change in the SKP symbol. The value of the COM comparator 920 is also 1 at TimeStamp 10, in which case if the value of the 9-bit register is output, the requirement of an SKP sequence set is not satisfied because the SKP sequence set includes only two SKP symbols. In order to prevent this problem, an underlying SKP symbol is converted into a COM symbol. Likewise, the 9-bit upper data output unit 520 and the 9-bit lower data output unit 510 output the values of the 9-bit upper data register 540 and the 9-bit lower data register 530 in which there has been a change in the SKP symbol from TimeStamp 14 at which the SKP comparator 910 detected a change in the SKP symbol.

FIGS. 18 and 19 show still another problem that occurs when deskew is processed using a COM symbol. An SKP symbol is added in a reference lane at TimeStamp 8, but the added SKP symbol is not detected by an additional lane. Accordingly, the synchronization between lanes is not achieved because data including the added SKP symbol is output without change. Furthermore, the subsequent addition of an SKP symbol is recognized as being the addition of an SKP sequence set itself because COM and SKP forms are added. In this case, a problem may arise in a subsequent operation because the reception of only one SKP sequence set may be erroneously recognized as being the reception of two SKP sequence sets.

FIGS. 20, 21, and 22 illustrate that the problems of FIGS. 18 and 19 are solved by the present invention. The 9-bit upper data output unit 580 and the 9-bit lower data output unit 570 output the values of the 9-bit upper data register 540 and the 9-bit lower data register 530 before TimeStamp 8, but start outputting the values of the 9-bit upper data register 540 and the 9-bit lower data register 530 from TimeStamp 8 at which a change in the SKP symbol in a reference lane is detected. Thereafter, the 9-bit upper data output unit 580 and the 9-bit lower data output unit 570 output the values of the 9-bit upper data register 540 and the 9-bit lower data register 530 from TimeStamp 12 at which a change in the SKP symbol was detected. Here, in order to prevent the redundancy of an SKP sequence set because the value of the COM comparator 920 is also 1 at TimeStamp 12, the value is changed to the value of the SKP symbol instead of the value of a COM symbol and then the resulting value is output. The 9-bit upper data output unit 580 and the 9-bit lower data output unit 570 output the values of the 9-bit upper data register 540 and the 9-bit lower data register 530 from TimeStamp 17 at which a change in the SKP symbol was detected.

As described above, the deskew apparatus and method for PCI Express according to the present invention have the advantage of aligning input data, composed of upper and lower 2 bytes, that is, 16 bits, rather than 1 byte, that is, 8 bits (i.e., the basic unit of data in the PCI Express standard), based on the lower byte, thereby preventing data from being lost.

Furthermore, the deskew apparatus and method for PCI Express according to the present invention have the advantage of detecting a change in a state of alignment attributable to the deletion or addition of an SKP symbol when data is aligned, thus being able to deal with data being in a state of non-alignment as occurs because of the use of an SKP sequence set that compensates for the difference in the clock speed between lanes.

Accordingly, the present invention is advantageous in that it is configured to compensate for static skew by aligning input data in PCI Express on a 18-bit basis and also compensate for dynamic skew by detecting a change in a state of alignment of the 18-bit data attributable to the deletion or addition of an SKP symbol when the 18-bit data is aligned, thereby increasing data transfer efficiency and also being able to be used in a variety of layers of PCI Express without additional alignment of data.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A deskew apparatus for Peripheral Component Interconnect (PCI) Express for compensating for a skew, the deskew apparatus comprising:
    a lane data input unit configured to receive 18-bit data from each of lanes of the PCI Express;
    a lane data alignment unit configured to align the 18-bit data using a COM symbol; and
    a lane data detection unit configured to detect a change in a state of alignment of the 18-bit data attributable to deletion or addition of an SKP symbol when the 18-bit data is aligned, instead of by detecting the COM symbol, and to perform synchronization between the lanes.

2. The deskew apparatus of claim 1, wherein the lane data alignment unit comprises:
    a 9-bit lower data input unit configured to receive lower 9-bit data, including the COM symbol, which is selected from the 18-bit data;
    a 9-bit upper data input unit configured to receive upper 9-bit data, including a symbol other than the COM symbol, which is selected from the 18-bit data;
    a 9-bit lower data register configured to store content of the 9-bit lower data input unit;
    a 9-bit upper data register configured to store content of the 9-bit upper data input unit;
    an alignment signal output unit configured to output an alignment signal by determining whether the received lower and upper 9-bit data have been aligned; and
    a data control unit configured to control output of the lower and upper 9-bit data based on results of the determination.

3. The deskew apparatus of claim 2, wherein the alignment signal output unit outputs the alignment signal as '0' if, as a result of the determination, it is determined that the received lower and upper 9-bit data are in a state of alignment, and outputs the alignment signal as '1' if, as a result of the determination, it is determined that the received lower and upper 9-bit data are in a state of non-alignment.

4. The deskew apparatus of claim 3, wherein the alignment signal output unit determines that the received lower and upper 9-bit data are in a state of alignment if the lower 9-bit data input to the 9-bit lower data input unit is the COM symbol and the upper 9-bit data input to the 9-bit upper data input unit is a symbol other than the COM symbol.

5. The deskew apparatus of claim 3, wherein the alignment signal output unit determines that the received lower and upper 9-bit data is in a state of non-alignment if the lower 9-bit data input to the 9-bit lower data input unit is a symbol other than the COM symbol and the upper 9-bit data input to the 9-bit upper data input unit is the COM symbol.

6. The deskew apparatus of claim 2, wherein the data control unit, if, as a result of the determination, it is determined that the received lower and upper 9-bit data is in a state of alignment, performs control so that the content of the 9-bit lower data register is output to a 9-bit lower data output unit and the content of the 9-bit upper data register is output to a 9-bit upper data output unit.

7. The deskew apparatus of claim 2, wherein the data control unit, if, as a result of the determination, it is determined that the received lower and upper 9-bit data is in a state of non-alignment, performs control so that the content of the 9-bit lower data register is output to a 9-bit upper data output unit and the content of the 9-bit upper data register is output to a 9-bit lower data output unit.

8. The deskew apparatus of claim 1, wherein the lane data detection unit comprises:
    an SKP comparator configured to output a value of the SKP symbol attributable to the addition or deletion of the SKP symbol when the 18-bit data is aligned; and
    a COM comparator configured to output a value of the COM symbol corresponding to the output value of the SKP symbol.

9. The deskew apparatus of claim 8, wherein the lane data detection unit compares the output value of the SKP symbol with the value of the COM symbol, and, if, as a result of the comparison, a requirement of an SKP sequence set is not satisfied, performs the synchronization by changing the value of the SKP symbol to the value of the COM symbol.

10. The deskew apparatus of claim 8, wherein the lane data detection unit compares the output value of the SKP symbol with the value of the COM symbol, and, if, as a result of the comparison, there is redundancy in an SKP sequence set, performs the synchronization by changing the value of the SKP symbol to the value of the SKP symbol other than the value of the COM symbol.

11. A method of compensating for deskew of Peripheral Component Interconnect (PCI) Express, the method comprising:
    receiving, by a lane data input unit, 18-bit data from each of lanes of the PCI Express;
    aligning, by a lane data alignment unit, the 18-bit data using a COM symbol; and
    detecting, by a lane data detection unit, a change in a state of alignment of the 18-bit data attributable to deletion or addition of an SKP symbol when the 18-bit data is aligned, instead of by detecting the COM symbol, and performing, by a lane data detection unit, synchronization between the lanes.

12. The method of claim 11, wherein the aligning the 18-bit data using the COM symbol comprises determining, by the lane data alignment unit, that 9-bit data is in a state of alignment if lower 9-bit data input to a 9-bit lower data input unit is the COM symbol and upper 9-bit data input to a 9-bit upper data input unit is a symbol other than the COM symbol.

13. The method of claim 11, wherein the aligning the 18-bit data using the COM symbol comprises determining, by the lane data alignment unit, that the 9-bit data is in a state of non-alignment if lower 9-bit data input to a 9-bit lower data input unit is a symbol other than the COM symbol and upper 9-bit data input to a 9-bit upper data input unit is the COM symbol.

14. The method of claim 11, further comprising, after the detecting a change in a state of alignment of the 18-bit data attributable to the deletion or addition of an SKP symbol when the 18-bit data is aligned and performing synchronization between the lanes, comparing, by the lane data detection unit, a value of the SKP symbol, output because of the addition or deletion of the SKP symbol when the 18-bit data is aligned, with a value of a COM symbol output in accordance with the value of the SKP symbol, and then changing a symbol based on results of the comparison.

15. The method of claim 14, wherein the changing the symbol comprises comparing, by the lane data detection unit, the output value of the SKP symbol with the value of the COM symbol, and, if, as a result of the comparison, a requirement of an SKP sequence set is not satisfied, performing, by the lane data detection unit, the synchronization by changing the value of the SKP symbol to the value of the COM symbol.

16. The method of claim 14, wherein the changing the symbol comprise comparing, by the lane data detection unit, the output value of the SKP symbol with the value of the COM symbol and, if, as a result of the comparison, there is redundancy in an SKP sequence set, performing, by the lane data detection unit, the synchronization by changing the value of the SKP symbol to the value of the SKP symbol other than the value of the COM symbol.

\* \* \* \* \*